United States Patent
Yamasaki

(10) Patent No.: US 7,173,765 B2
(45) Date of Patent: Feb. 6, 2007

(54) INFORMATION DISPLAY SYSTEM

(75) Inventor: Masafumi Yamasaki, Hachioji (JP)

(73) Assignee: Olympus Corporation (JP)

( * ) Notice: Subject to any disclaimer, the term of this patent is extended or adjusted under 35 U.S.C. 154(b) by 0 days.

(21) Appl. No.: 11/180,883

(22) Filed: Jul. 13, 2005

(65) Prior Publication Data

US 2006/0018027 A1    Jan. 26, 2006

(30) Foreign Application Priority Data

Jul. 20, 2004   (JP)   ............................. 2004-212088

(51) Int. Cl.
*G02B 27/14*   (2006.01)
*G09G 5/00*   (2006.01)

(52) U.S. Cl. .......................................... 359/630; 345/8

(58) Field of Classification Search ................ 359/630, 359/631; 345/7–9, 211–213
See application file for complete search history.

(56) References Cited

U.S. PATENT DOCUMENTS 6,911,969 B1 *   6/2005   Nelson et al. .............. 345/163

FOREIGN PATENT DOCUMENTS

| JP | 10-123970 | 5/1998 |
|----|-----------|--------|
| JP | 2001-008130 | 1/2001 |

* cited by examiner

*Primary Examiner*—Scott J. Sugarman
*Assistant Examiner*—Jack Dinh
(74) *Attorney, Agent, or Firm*—Ostrolenk, Faber, Gerb & Soffen, LLP

(57) ABSTRACT

An information display system according to the present invention includes a head-mounted unit having a see-through information display portion displaying images so that the images can be observed as virtual images, a first transmitter-receiver for receiving a power supply instruction signal for supplying electric power from a main unit by radio, and a first power supply circuit including a battery for supplying electric power to the head-mounted unit on receiving the power supply instruction signal; and the main unit having a second power supply circuit including a battery for supplying electric power to the main unit on receiving the operation of a power supply switch and a second transmitter-receiver for transmitting the power supply instruction signal to the head-mounted unit by radio simultaneously with the power supplying to the main unit.

2 Claims, 16 Drawing Sheets

INFORMATION DISPLAY SYSTEM

This application claims benefit of Japanese Application No. 2004-212088 filed in Japan on Jul. 20, 2004, the contents of which are incorporated by this reference.

BACKGROUND OF THE INVENTION

1. Field of the Invention

The present invention relates to an information display system including a main unit for generating display data and a head-mounted unit for displaying information.

2. Description of the Related Art

Display apparatuses for observing images by wearing on a head, such as a HMD (head-mounted display) and a HUD (head up display), have been known.

As an example of such a display apparatus, a head-mounted display system is disclosed in Japanese Unexamined Patent Application Publication No. 10-123970, in which a display portion for use by wearing on a head and a control unit having a battery for supplying electric power to the entire system and controlling the display portion are connected together via cables.

As another example, Japanese Unexamined Patent Application Publication No. 2001-8130 also discloses an apparatus that includes a head-mounted image display apparatus for observing images in a state mounted on a head and a DVD player connected to the head-mounted image display apparatus via cables for feeding an image signal to the display apparatus. In this Publication, a technique is also described in which when an image signal to be inputted to the head-mounted image display apparatus does not exist, useless electric power consumption is suppressed by stopping the power supply to the head-mounted image display apparatus.

In such a manner, in these Publications, described is a display apparatus in which a display portion to be mounted on a head and a control unit configured independently from the display portion for controlling the display portion are connected via cables and a battery attached on the display portion supplies power to the entire system including both units.

However, in the systems described in both the Publications, in addition to cables for sending image signals, cables for supplying electric power are necessary, so that cables are increased in diameter. If the cables have a large diameter, they are somewhat difficult to be curved and routed around while the weight of the cables is applied to the display portion to be mounted on a head, so that an observer feels the weight of the display portion heavier than its actual weight. Moreover, when cables are used for connecting the display portion to the control unit, cables may be coiled around the observer's body when used, and when the system is carried in a bag, cables may get entangled with themselves, the control unit, or the display portion, so that the system is not so user-friendly.

Furthermore, in the systems described in both the Publications, when the head-mounted unit is not in service, if the power supply is turned on by mistake, the electric power is consumed in vain.

SUMMARY OF THE INVENTION

Accordingly, it is an object of the present invention to provide an information display system having a high degree of freedom in its portable use and capable of easily operating a power supply.

In summary, an information display system according to the present invention includes a head-mounted unit mounted on the head of an observer for displaying information so that specific-information can be observed; and a main unit for generating display data to be displayed on the head-mounted unit, wherein the head-mounted unit includes a first receiver to receive by radio a power supply instruction signal for supplying electric power to the head-mounted unit from the main unit; and a first power source including a battery for supplying electric power to the head-mounted unit on receiving the power supply instruction signal, and wherein the main unit includes a signal generator to generate a power supply start signal for starting power supply to the main unit; a second power source including a battery for supplying electric power to the main unit on receiving the power supply start signal; and a transmitter to transmit the power supply instruction signal to the first receiver by radio simultaneously with the power supplying to the main unit.

The above and other objects, features, and advantages of the invention will become more clearly understood from the following description referring to the accompanying drawings.

DETAILED DESCRIPTION OF THE PREFERRED EMBODIMENT

Embodiments according to the present invention will be described below with reference to the drawings.

Figure 1:
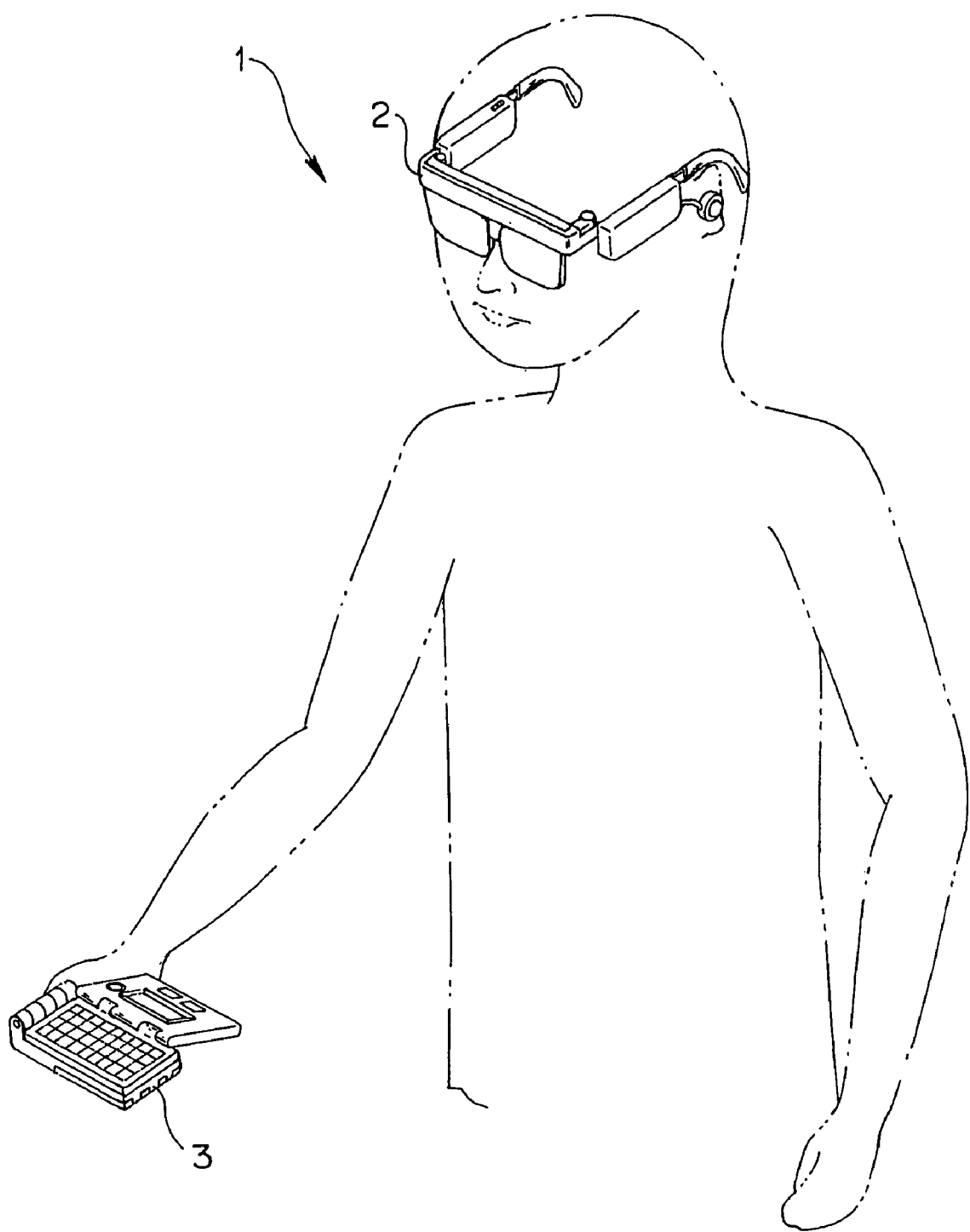
FIG. 1 is a perspective view illustrating a serving condition of an information display apparatus according to a first embodiment of the present invention.

FIGS. 1 to 25 show a first embodiment of the present invention. FIG. 1 is a perspective view illustrating an operational pattern of an information display apparatus 1 in use.

The information display apparatus 1, as shown in FIG. 1, is substantially composed of a glasses type head-mounted unit 2 and a main unit 3 configured separately from the head-mounted unit 2 for giving/receiving information by communicating with the head-mounted unit 2 by radio.

The head-mounted unit 2 allows a user to observe a subject (external thing) substantially directly in a see-through display mode and also to observe information superimposed thereon. The head-mounted unit 2, as is understood from the glasses type shape, is worn on a head in substantially the same way as a general pair of spectacles for eyesight-correcting, and a feeling of wearing is improved by reducing the size and weight so as to approximate to those of a general pair of spectacles as much as possible.

The main unit 3 transmits display information and a remote control signal to the head-mounted unit 2 by wireless communication, and further controls the entire information display apparatus 1. As for the main unit 3, reduction in size and weight is performed within a possible range in the same way as in the head-mounted unit 2.

Thus, a user can behave freely and smoothly without being annoyed by cables while wearing the head-mounted unit 2 thereon. The main unit 3 also has improved operability and portability because no cable is extended therefrom.

Figure 2:
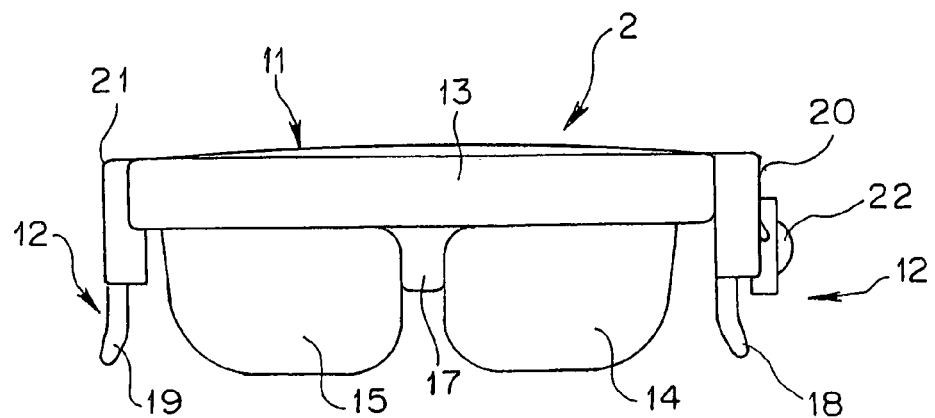
FIG. 2 is a front view of a head-mounted unit according to the first embodiment.
Figure 3:
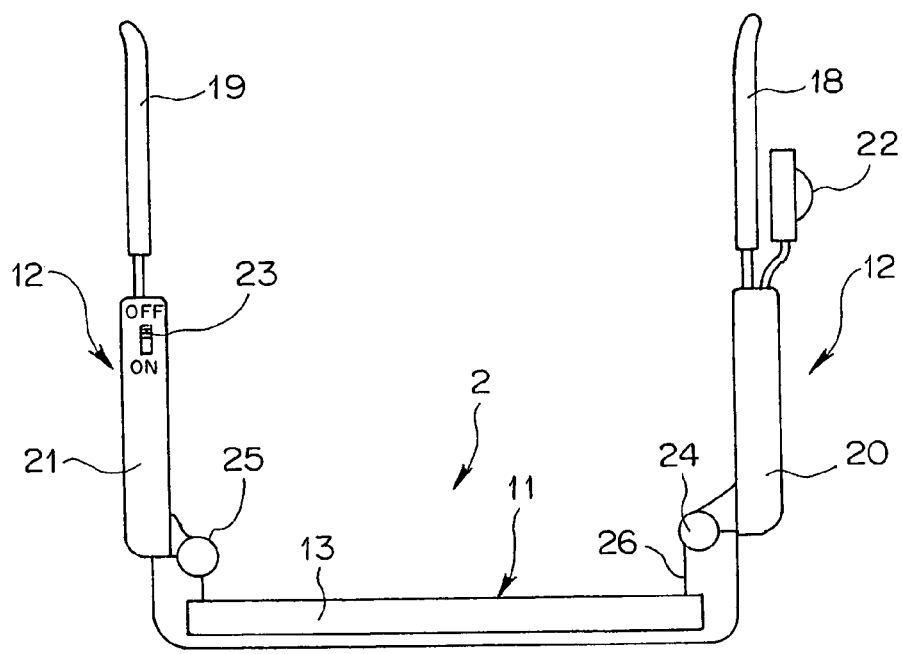
FIG. 3 is a plan view of the head-mounted unit according to the first embodiment.
Figure 4:
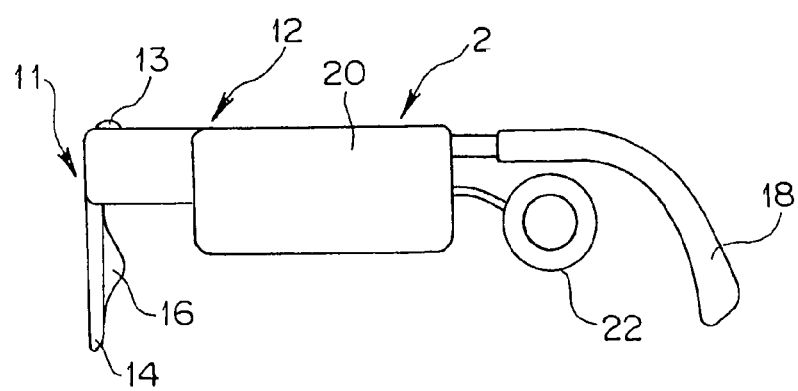
FIG. 4 is a right side view of the head-mounted unit according to the first embodiment.

Then, the external shape and summary of the head-mounted unit 2 will be described with reference to FIGS. 2 to 4. FIG. 2 is a front view of the head-mounted unit 2; FIG. 3 is a plan view thereof; and FIG. 4 is a right side view thereof.

The head-mounted unit 2 comprises a front portion 11, corresponding to lenses, a rim, a bridge, and joints of general glasses, and temples 12 extending rearward (opposite to an object) from lateral both sides of the front portion 11 and being collapsible relative to the front portion 11.

The front portion 11 includes a frame portion 13 and transparent optical members 14 and 15 attached to the frame portion 13 so as to correspond to both eyes, respectively, for guiding light.

The frame portion 13 is provided with a nose pad 16 arranged at the center for placing the head-mounted unit 2 on a nose bridge and a bridge 17 arranged on the upper portion between the transparent optical members 14 and 15.

The temples 12 are connected to the front portion 11 with hinges 24 and 25 therebetween, respectively, so as to be collapsible relative to the front portion 11. That is, when in non-use, the temples 12 can be folded toward the center so as to have a state collapsed along the front portion 11, the storage and carrying can be conveniently performed by miniaturizing. End covers 18 and 19 for placing the head-mounted unit 2 on the ears are provided at the distal ends of the left and right temples 12.

Furthermore, an electric equipment unit 20 for storing electronic circuits mainly for controlling see-through display is integrally provided at the left-eye (on the right in FIG. 2 or 3) temple 12, and a battery storage portion 21 for mainly storing a power supply circuit 92 (see FIG. 13) for the head-mounted unit is integrally provided at the right-eye temple 12. The battery storage portion 21 is configured so as to detachably store a battery, and is provided with a power supply switch 23 arranged on the upper surface for turning on/off the power supply for the head-mounted unit 2. Accordingly, when the temples 12 are folded, the electric equipment unit 20 and the battery storage portion 21 are also collapsed according to the temples 12. In such a manner, the electric equipment unit 20 and the battery storage portion 21 are arranged on the temples 12, so that the information display apparatus 1 can be stored in compact.

In addition, the front portion 11, the electric equipment unit 20, and the battery storage portion 21 are configured so as to have an excellent wearing feeling by appropriately balancing shapes and weights.

Also, the electric equipment unit 20 is provided with a speaker 22 arranged to extend therefrom for hearing a voice from the left ear. According to the embodiment, a monaural sound can be heard by arranging the speaker 22 only on the left ear side; alternatively, speakers may be provided on both ears, respectively, so as to listen to a stereo sound.

A portion between the right of the front portion 11 and the hinge 24 is a box 26 to be stored with a flexible printed board connecting various circuits inside the front portion 11 to various circuits in the electric equipment unit 20. Similarly, a portion between the left of the front portion 11 and the hinge 25 is a box to be stored with a power supply line and a signal line connecting various circuits inside the front portion 11 to various circuits in the battery storage portion 21.

Figure 5:
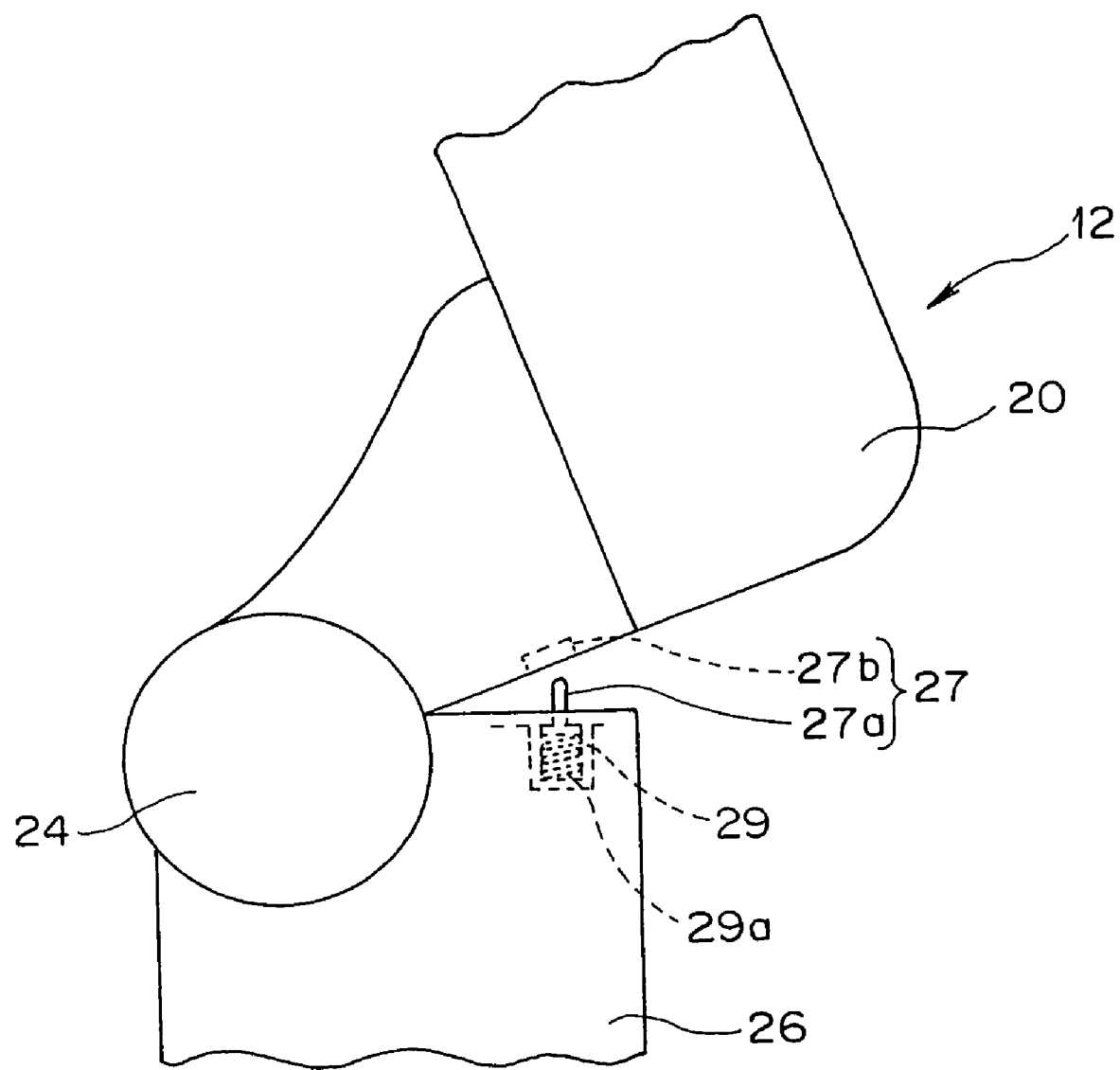
FIG. 5 is an enlarged partial plan view showing configuration of a switch according to the first embodiment for detecting open/close state of a temple provided in the vicinity of a hinge.

FIG. 5 is a partially enlarged plan view of a structure of a switch arranged in the vicinity of the hinge 24 for detecting opening or closing state of the temples 12.

As shown in FIG. 5, the box 26 is provided with a contact point 27a having a convex plunger extending toward the electric equipment unit 20 while the temple 12 is provided with a contact point 27b having a planer pedestal arranged at a position opposing the contact point 27a. These contact points 27a and 27b constitute the switch 27 for detecting opening/closing state of the temples 12.

The box 26 is also provided with a concave portion 29 for supporting the contact point 27a slidably in the forward/backward direction and a spring 29a provided inside the concave portion 29 for urging the contact point 27a toward the electric equipment unit 20.

By such a structure, when the contact point 27a does not abut the contact point 27b, the contact point 27a stops at a position abutting the internal wall of the box 26 so as to partially extend the projection from the external wall of the box 26.

Then, upon opening the temple 12 via the hinge 24, the contact point 27a comes into contact with the contact point 27b so as to close the switch 27 at a position slightly before the opened position shown in FIG. 3 (a position when the temple 12 is folded by more than a predetermined angle toward the closed position along the front portion 11 from the opened position shown in FIG. 3).

By such a structure, corresponding to whether the switch 27 is opened or closed, it can be detected whether the temple 12 is not opened to a predetermined position (an unavailable state) or the temple 12 is opened to a predetermined position (an available state).

In addition, at a position corresponding to the left side of FIG. 3, i.e., in the vicinity of the hinge 25, there is provided a switch 28 (see FIG. 13) structured in the same way.

It is assumed that when at least one of the switches 27 and 28 is opened, the head-mounted unit 2 be in non-use such as a stored state. Alternatively, granted that it is mounted on a head, and at least one of the switches 27 and 28 is opened, the information displayed cannot be normally projected to user's eyes, so it is not preferable to be observable as it is. Accordingly, when at least one of the switches 27 and 28 is opened in such a manner, the electric power supply from a power supply circuit 92 (see FIG. 13) for the head-mounted unit 2 is forcedly turned off by determining that the head-mounted unit 2 is unavailable. By such a control, the electric power can be suppressed from being consumed in vain when the head-mounted unit 2 is in the unavailable state.

Also, when the information display apparatus 1 is used in a playback mode (will be described later and see FIG. 11) and the switches 27 and 28 are closed, the display in an LCD 104 of the head-mounted unit 2 is forcedly carried-out. On the other hand, in an initial state of the playback mode, when at least one of the switches 27 and 28 is opened so as to be in an unavailable state (i.e., when at least one of the temples 12 is folded), information is forcedly displayed on an LCD 51 of the main unit 3.

Figure 6:
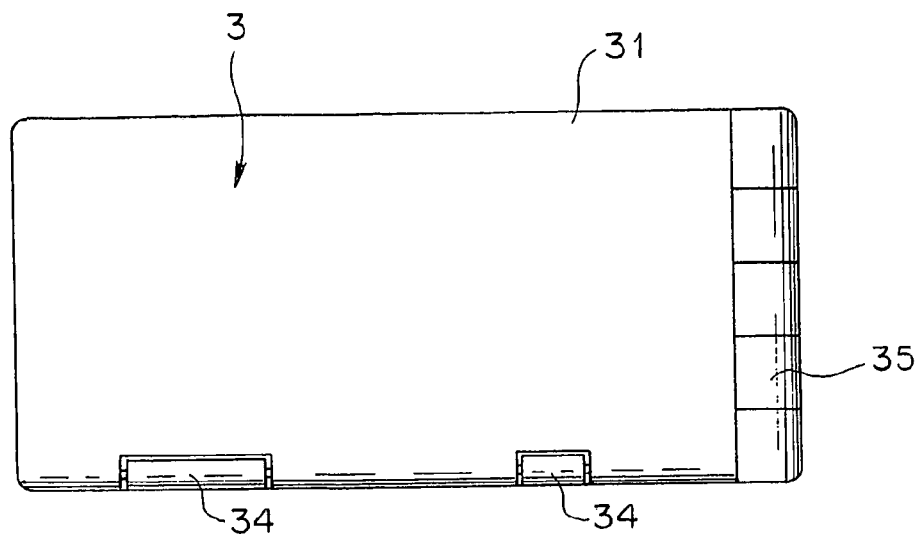
FIG. 6 is a plan view of a main unit according to the first embodiment in a state that casings are entirely closed.
Figure 7:
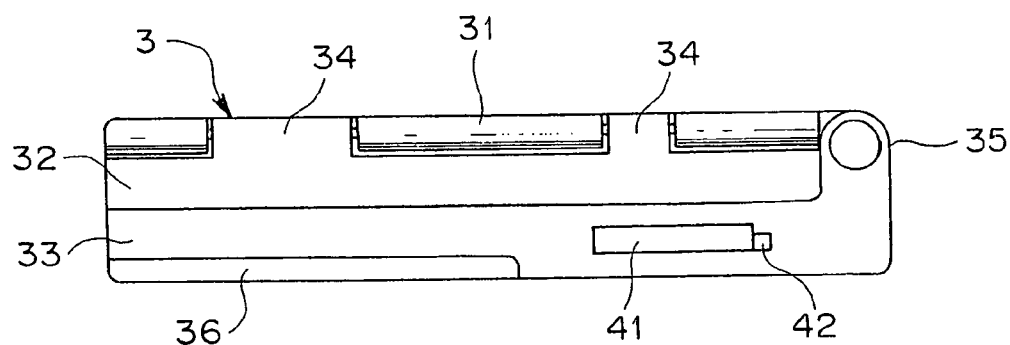
FIG. 7 is a right side view of the main unit according to the first embodiment in a state that the casings are entirely closed.
Figure 8:
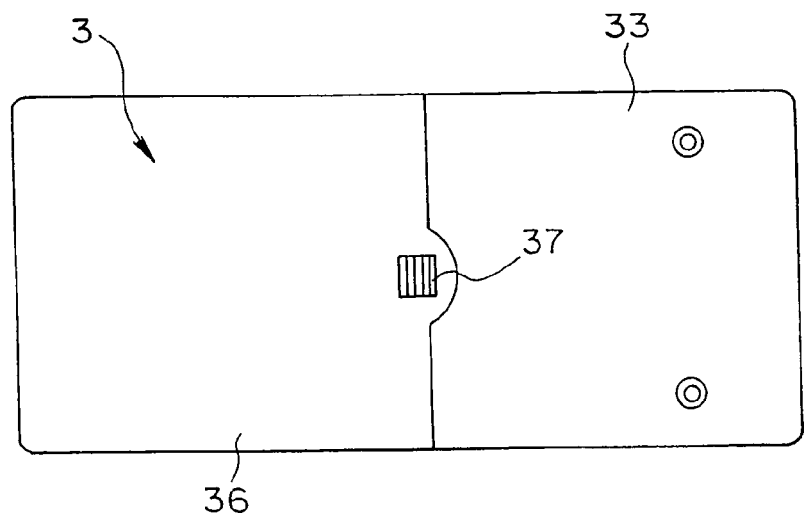
FIG. 8 is a bottom view of the main unit according to the first embodiment in a state that the casings are entirely closed.
Figure 9:
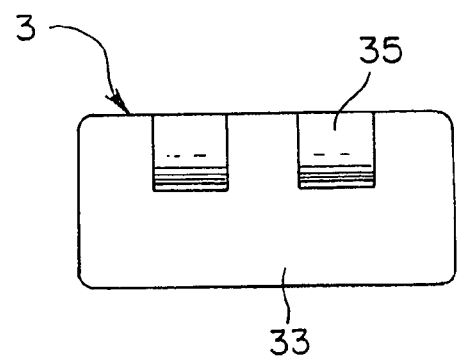
FIG. 9 is a rear view of the main unit according to the first embodiment in a state that the casings are entirely closed.
Figure 10:
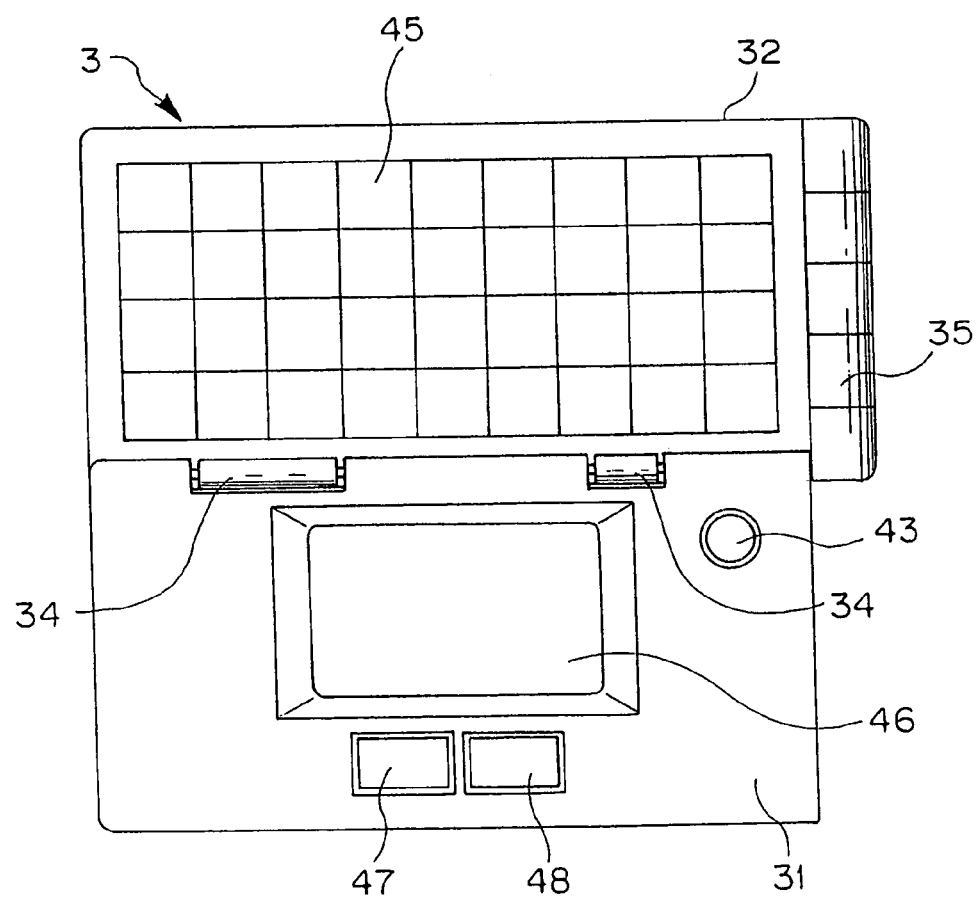
FIG. 10 is a plan view of the main unit according to the first embodiment in a state that only the upper casing is opened.

Next, the external shape and summary of the main unit 3 will be described with reference to FIGS. 6 to 11. FIG. 6 is a plan view of the main unit 3 in a state that the entire casings are closed; FIG. 7 is a right side view of the main unit 3 in a state that the entire casings are closed; FIG. 8 is a bottom view of the main unit 3 in a state that the entire casings are closed; FIG. 9 is a back view of the main unit 3 in a state that the entire casings are closed; FIG. 10 is a plan view of the main unit 3 in a state that only the upper casing is opened; and FIG. 11 is a plan view of the main unit 3 in a state that the upper casing is closed while an intermediate casing is opened.

The main unit 3 is layered of three substantially rectangular and planar casings, an upper casing 31, an intermediate casing 32, and a lower casing 33, which are deposited in the thickness direction.

The upper casing 31, as shown in FIG. 10, is rotatably attached to the intermediate casing 32 with hinges 34 therebetween. The hinge 34 has a contact inside configured with a known structure for electrically connecting between the upper casing 31 and the intermediate casing 32.

Figure 11:
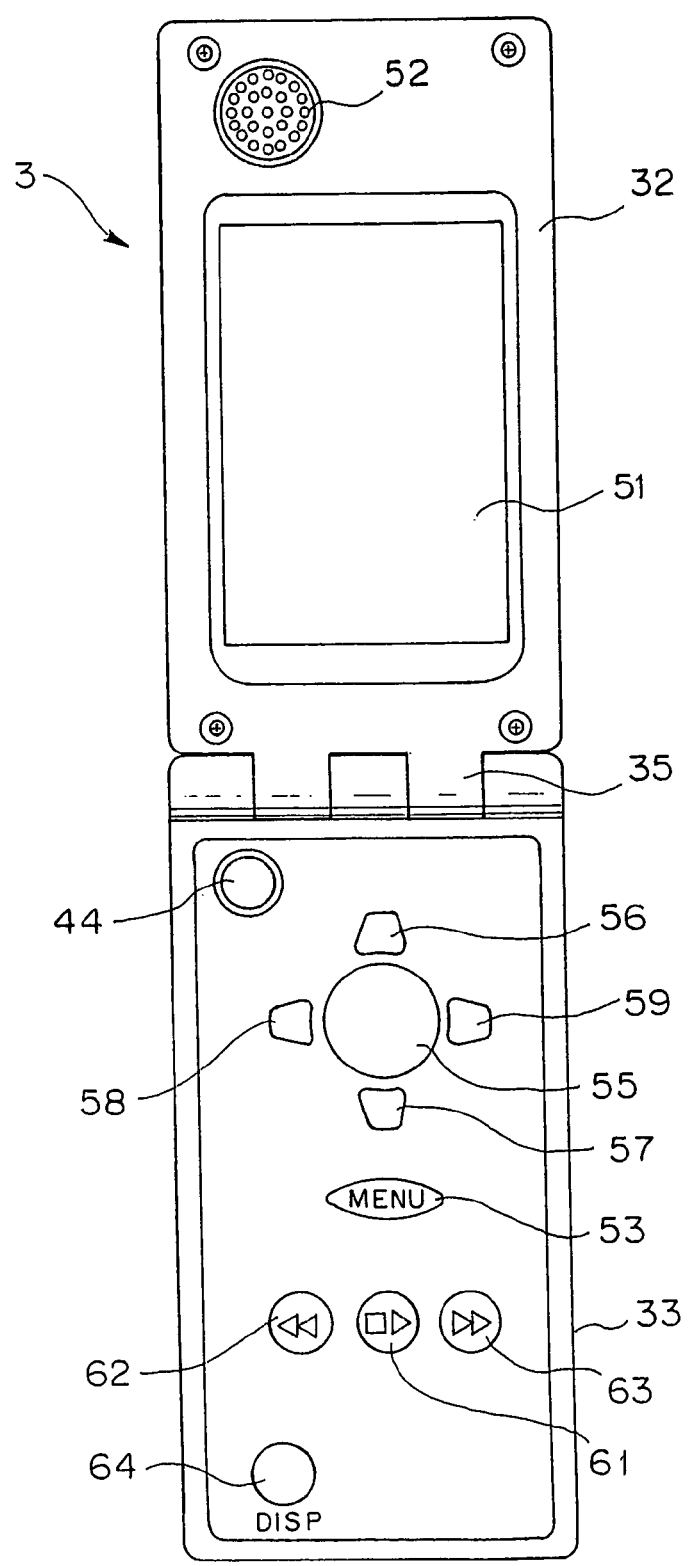
FIG. 11 is a plan view of the main unit according to the first embodiment in a state that the upper casing is closed and the intermediate casing is opened.

The intermediate casing 32, as shown in FIG. 11, is also attached to the lower casing 33 rotatably via a hinge 35. The hinge 35 has a contact inside configured with a known structure for electrically connecting between the intermediate casing 32 and the lower casing 33.

The lower casing 33, as shown in FIGS. 7 and 8, is provided with a battery storing portion 36 formed on the bottom surface, and a detachable battery built therein can be replaced by sliding a cover 37 in the left direction of FIG. 8. The lower casing 33, as shown in FIG. 7, is also provided with a recording medium storing portion 41 formed on the right side face for storing a recording medium such as a detachable memory card. By operating an eject button 42, the recording medium can be removed.

Next, when the upper casing 31 is opened through the hinges 34, it becomes the state shown in FIG. 10.

The upper casing 31, as shown in FIG. 10, is provided with a first power supply switch 43, a pad-type pointing device 46, a left button 47, and a right button 48 formed on the bottom surface exposed in the opened state (it is the upper surface in the opened state of FIG. 10).

The first power supply switch 43 is signal generating means for supplying an electric source to a circuit for making the information display apparatus 1 carry out a function of an information input device. According to the embodiment, there is provided an independent power supply switch to be operated by a finger; alternatively, it may be structured as a power supply switch operatively associated with the rotating operation of the hinge 34. In this case, it is assumed that the power supply switch is provided inside the hinge 34. By such a structure, by only opening the upper casing 31, the information display apparatus 1 can be made to carry out a function of the information input device.

The intermediate casing 32, as shown in FIG. 10, is also provided with a keyboard 45 arranged on the upper surface exposed in the opened state for inputting information such as characters.

Thus, in the state that only the upper casing 31 is opened as shown in FIG. 10, the main unit 3 functions as an operating switch capable of operating in the same way as that in a keyboard and a mouse in a general personal computer.

Subsequently, when the intermediate casing 32 is opened relative to the lower casing 33 via the hinge 35 after the upper casing 31 is closed, it becomes the state shown in FIG. 11.

In the state shown in FIG. 11, the main unit 3 serves as a playback device to display images, and also functions as an operating switch for operating the playback device. A mode, in which the information display apparatus 1 is used for the playback device as shown in FIG. 11, is referred to as a playback mode.

The intermediate casing 32, as shown in FIG. 11, is provided with a speaker 52 for generating a sound and the LCD 51 for displaying playback images as a second displaying means which are arranged on the bottom surface exposed in the opened state (it is the upper surface in the opened state of FIG. 11).

The lower casing 33, as shown in FIG. 11, is provided with a second power supply switch 44, a menu button 53, a determination switch 55, menu select switches 56, 57, 58, and 59, a playback/stop switch 61, a fast reverse switch 62, a fast forward switch 63, and a display select switch 64 arranged on the upper surface exposed in the opened state.

The second power supply switch 44 is arranged on the surface of the lower casing 33 at the upper left, for example, and it is signal generating means for supplying an electric source to a circuit for making the information display apparatus 1 carry out a function of a playback device. According to the embodiment, there is provided an independent power supply switch to be operated by a finger; alternatively, it may be structured as a power supply switch operatively associated with the rotating operation of the hinge 35. In this case, it is assumed that the power supply switch is provided inside the hinge 35. By such a structure, by only opening the intermediate casing 32, the information display apparatus 1 can be made to carry out a function of the playback device.

In such a manner, the first and second power supply switches 43 and 44 may also be referred to as mode select switches to make the information display apparatus 1 whether carry out a function of the information input device or a function of the playback device.

The display select switch 64 is included in a second operation switch 73 (will be described later and see FIG. 12) as selecting means and arranged on the surface of the lower casing 33 at the lower left, for example. The display select switch 64 is of an automatic return type. When the information display apparatus 1 is functioning as the playback device, a first display mode displaying information on the LCD 51 is switched to a second display mode displaying information on the head-mounted unit 2 repeatedly every time the display select switch 64 is turned on.

According to the embodiment, in an initial state that the intermediate casing 32 is opened and the second power supply switch 44 is turned on, the main unit 3 transmits a signal for determining whether the head-mounted unit 2 is unavailable or not to the head-mounted unit 2.

Then, when a power supply circuit 92 (see FIG. 13) is turned on, the head-mounted unit 2 transmits a signal for indicating whether the head-mounted unit 2 is unavailable or not to the main unit 3. Whereas, the head-mounted unit 2 does not return any signal of course when the power supply circuit 92 is turned off. Hence, the main unit 3 can determine whether the power supply circuit 92 is turned on or not by the presence of the reply from the head-mounted unit 2. Even when a user thinks that the power source of the head-mounted unit 2 is turned on, the power supply circuit 92 may be forcedly turned off by a power saving function due to non-use for a predetermined time. Even in such a case, the state of the power supply circuit 92 of the head-mounted unit 2 can be determined by the presence of the reply. The main unit 3 classifies the head-mounted unit 2 as the unavailable state in the absence of the reply from the head-mounted unit 2.

Also, in the presence of the reply from the head-mounted unit 2, the main unit 3 further determines whether the reply content shows the available state or the unavailable state.

Even when the power supply circuit 92 is turned on, if at least one of the switches 27 and 28 is opened (turned off), the head-mounted unit 2 is to return a signal showing the unavailable state.

That is, the main unit 3 determines that the head-mounted unit 2 is in the available state when both the switches 27 and 28 are closed and also the power supply of the power supply circuit 92 is turned on, while determines that the head-mounted unit 2 is in the unavailable state when at least one of the switches 27 and 28 is opened or when the power supply of the power supply circuit 92 is turned off.

When the main unit 3 determines that the head-mounted unit 2 is in the available state, the second display mode is selected, while when the main unit 3 determines that the head-mounted unit 2 is in the unavailable state, the first display mode is selected.

In such a manner, it is determined which is suitable between the LCD 104 of the head-mounted unit 2 and the LCD 51 of the main unit 3 so as to alternatively select the LCD assumed to be suitable.

By such a structure, even when the head-mounted unit 2 is removed from a head, a user can confirm information by displaying the information on the main unit 3.

Furthermore, since a user is not required to select any one of the first display mode and the second display mode and information can be displayed on a suitable display apparatus, the operation is simplified and usability is improved.

When the main unit 3 inquires whether the head-mounted unit 2 is in the available state, if no reply is returned, the head-mounted unit 2 is determined to be in the unavailable state so as to automatically select the LCD 51 of the main unit 3 and display information thereon. Thereby, even when the power supply to the head-mounted unit 2 is completely turned off, or when the head-mounted unit 2 is located at a position where a wireless signal from the main unit 3 does not reach (specifically, in a case where the main unit 3 is stored in a bag hardly transmitting a wireless signal or in a case where a user brings only the main unit 3 and the head-mounted unit 2 is left at a house), information can be observed by appropriately and rapidly selecting the display mode without troublesome operation.

Because information is not simultaneously displayed on the head-mounted unit 2 and the main unit 3, useless electric power consumption is suppressed.

Moreover, since the information display apparatus 1 has power supplies in both the main unit 3 and the head-mounted unit 2, no cable is required for supplying an electric power source to the head-mounted unit 2, i.e., cables are not necessary to be connected to the head-mounted unit 2 for an image signal and the electric power source, so that the system is convenient to be carried due to the wireless.

Back to FIG. 11, the playback/stop switch 61 is used for playing back or temporarily stopping image information recorded on a record memory 83 (will be described later and or a hard disk 85) (see FIG. 12).

The fast reverse switch 62 is used for quickly returning images recorded on the record memory 83 (or the hard disk 85) in a direction reverse to the playback direction to be searched.

The fast forward switch 63 is used for fast-forwarding images recorded on the record memory 83 (or the hard disk 85) in the playback direction to be searched.

The menu button 53 is used for displaying a menu screen for executing various settings regarding image editing on the LCD 51.

The menu select switches 56, 57, 58, and 59 are used for moving an interest item among items displayed on the menu screen in the horizontal and vertical directions or for scrolling displayed information.

The determination switch 55 is used for determining an interest item displayed on the menu screen.

In the information display apparatus 1 according to the embodiment, if a period of time in which images are vanished from a display frame, which is a region for displaying images as will be described later, becomes longer than a predetermined time Ts, the display is to be in a low power consumption mode for reducing the power consumption of the entire information display apparatus 1. The predetermined time Ts in this case can also be established by operating the menu button 53, the menu select switches 56, 57, 58, and 59, and the determination switch 55.

Figure 12:
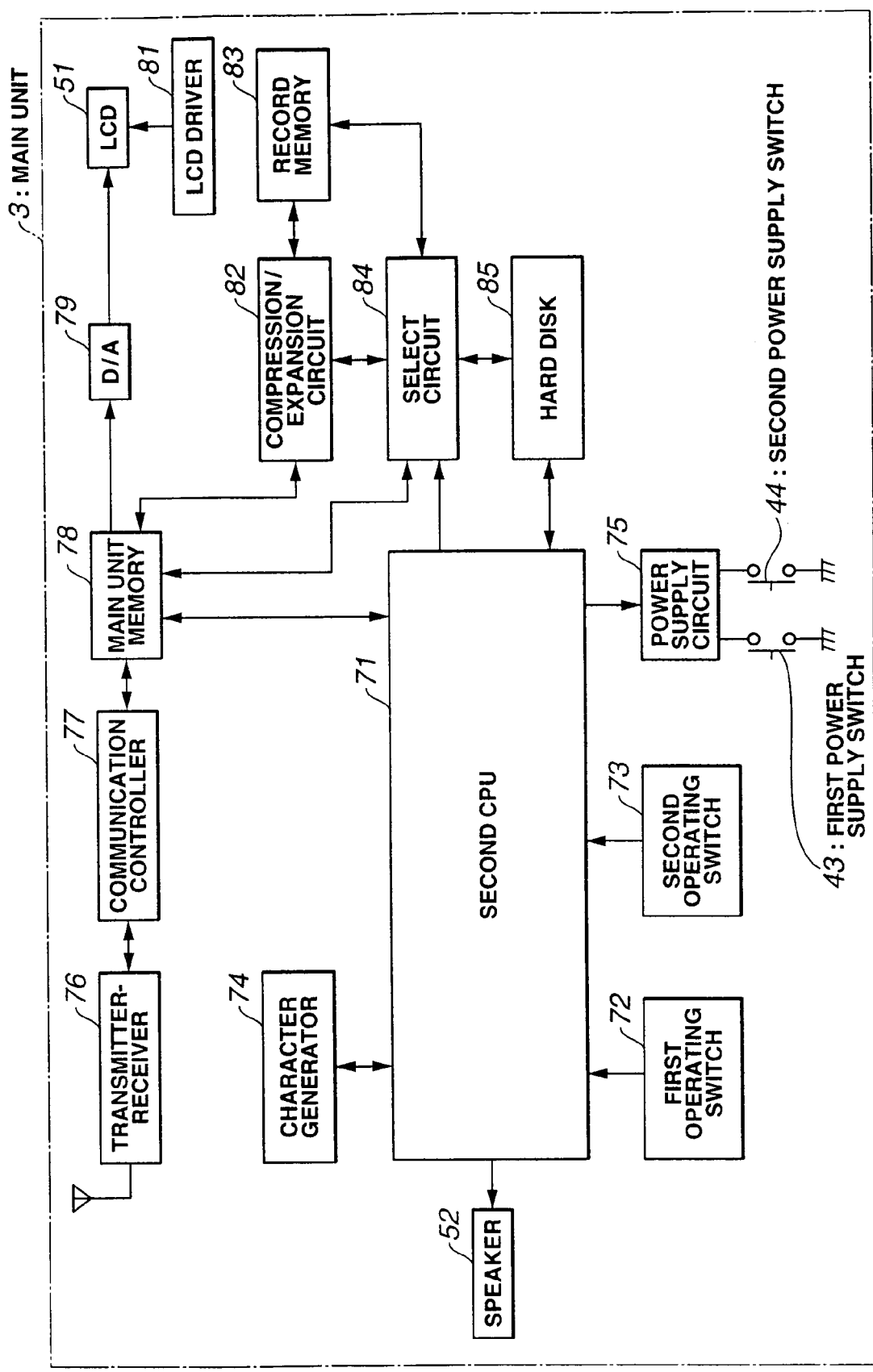
FIG. 12 is a block diagram mainly illustrating electronic circuits of the main unit in the information display apparatus according to the first embodiment.

FIG. 12 is a block diagram mainly showing the configuration of an electronic circuit of the main unit 3 in the information display apparatus 1.

The main unit 3 includes a transmitter-receiver 76, a communication controller 77, a main unit memory 78, a D/A converter 79, the LCD 51, an LCD driver 81, a compression/expansion circuit 82, a select circuit 84, the record memory 83, the hard disk 85, the speaker 52, a first operating switch 72, a second operating switch 73, a character generator 74, a power supply circuit 75, the first power supply switch 43, the second power supply switch 44, and a second CPU 71.

The transmitter-receiver 76 is used for receiving a wireless signal transmitted from the head-mounted unit 2 via an antenna or for transmitting a wireless signal to the head-mounted unit 2 via the antenna so as to serve a double purpose of second transmitting means and second receiving means.

The communication controller 77 is communication controlling means for frame synchronizing (synchronizing in frame unit by time-division multiple systems) and data formatting a slot, which is a component of a frame and configured including a pair of an attribute and an attribute value, so as to constitute the second transmitting means and the second receiving means.

The main unit memory 78 is storing means configured of a frame buffer or the like for temporarily storing information such as characters and images produced by the second CPU 71 or information such as characters and images read out of the detachable record memory 83 or the hard disk 85.

The D/A converter 79 is used for converting a digital signal stored in the main unit memory 78 into an analog signal.

The LCD 51 is displaying means for displaying images based on an analog image signal converted by the D/A converter 79.

The LCD driver 81 is display-drive controlling means for controlling the LCD 51.

The compression/expansion circuit 82 is compression/expansion means for compressing the digital signal stored in the main unit memory 78 and also for expanding the compressed digital signal read out of the record memory 83.

The select circuit 84 is input/output selecting means for selecting an input source and an output target bidirectionally based on a control signal from the second CPU 71. The bi-direction means that any of the main unit memory 78, the record memory 83, the hard disk 85, and the compression/expansion circuit 82 can become any of the input source and the output target. For example, the select circuit 84 is to select a target for outputting the digital signal compressed by the compression/expansion circuit 82 from the record memory 83, the hard disk 85, and the main unit memory 78. When information recorded in the record memory 83 or the hard disk 85 is stored in the main unit memory 78 so as to play back and display it, the select circuit 84 selects an output signal from any one of the record memory 83 and the hard disk 85 based on the control signal from the second CPU 71 so as to output it to the compression/expansion circuit 82. Furthermore, the select circuit 84 is also to select whether transferring data from the main unit memory 78 to the record memory 83 or the hard disk 85 or from the record memory 83 or the hard disk 85 to the main unit memory 78 is performed through the compression/expansion circuit 82 or not based on the control signal from the second CPU 71. When information is image data other than character data (hereinafter, "image data" is referred to as whole information except character data), the information is transferred after it is compressed or expanded through the compression/expansion circuit 82. On the other hand, when information is character data, it is transferred without the compression/expansion circuit 82 therebetween.

The record memory 83 comprising a detachable card memory, for example, is stored in the recording medium storing portion 41, and is recording means for recording the digital signal compressed by the compression/expansion circuit 82 when the record memory 83 is selected by the select circuit 84.

The hard disk 85 built in the main unit 3 is recording means for recording the digital signal compressed by the compression/expansion circuit 82 when the hard disk 85 is selected by the select circuit 84.

The speaker 52 is sound generating means for playing back voices associated with images based on the control of the second CPU 71 when the images are played back.

The first operating switch 72 is inputting means, including various switches shown in FIG. 10, for operating various entries when the information display apparatus 1 is made to carry out a function of an information input device.

The second operating switch 73 is inputting means, including various switches shown in FIG. 11, for operating various entries when the information display apparatus 1 is made to carry out a function of a playback device.

The character generator 74 is character information generating means for generating character data.

The power supply circuit 75 is power supplying means for supplying a power source to the main unit 3 as a second power source including a detachable battery accommodated in the battery storing portion 36.

The first power supply switch 43, connected to the power supply circuit 75, is a switch for supplying a power source to a circuit for making the information display apparatus 1 carry out a function of an information input device as mentioned above. Upon turning on the first power supply switch 43, an electric current is allowed to flow through circuits other than the second operating switch 73, the D/A converter 79, the LCD 51, and the LCD driver 81.

The second power supply switch 44, connected to the power supply circuit 75, is a switch for supplying a power source to a circuit for making the information display apparatus 1 carry out a function of a playback device as mentioned above. Upon turning on the second power supply switch 44, an electric current is allowed to flow through circuits other than the first operating switch 72.

The second CPU 71, controlling circuits in the main unit 3, also controls the head-mounted unit 2 by communicating with a first CPU 91 (will be described later and see FIG. 13) as integrated controlling means relating to the information display apparatus 1. The second CPU 71 also serves a double purpose of display data generating means and selecting means.

Figure 13:
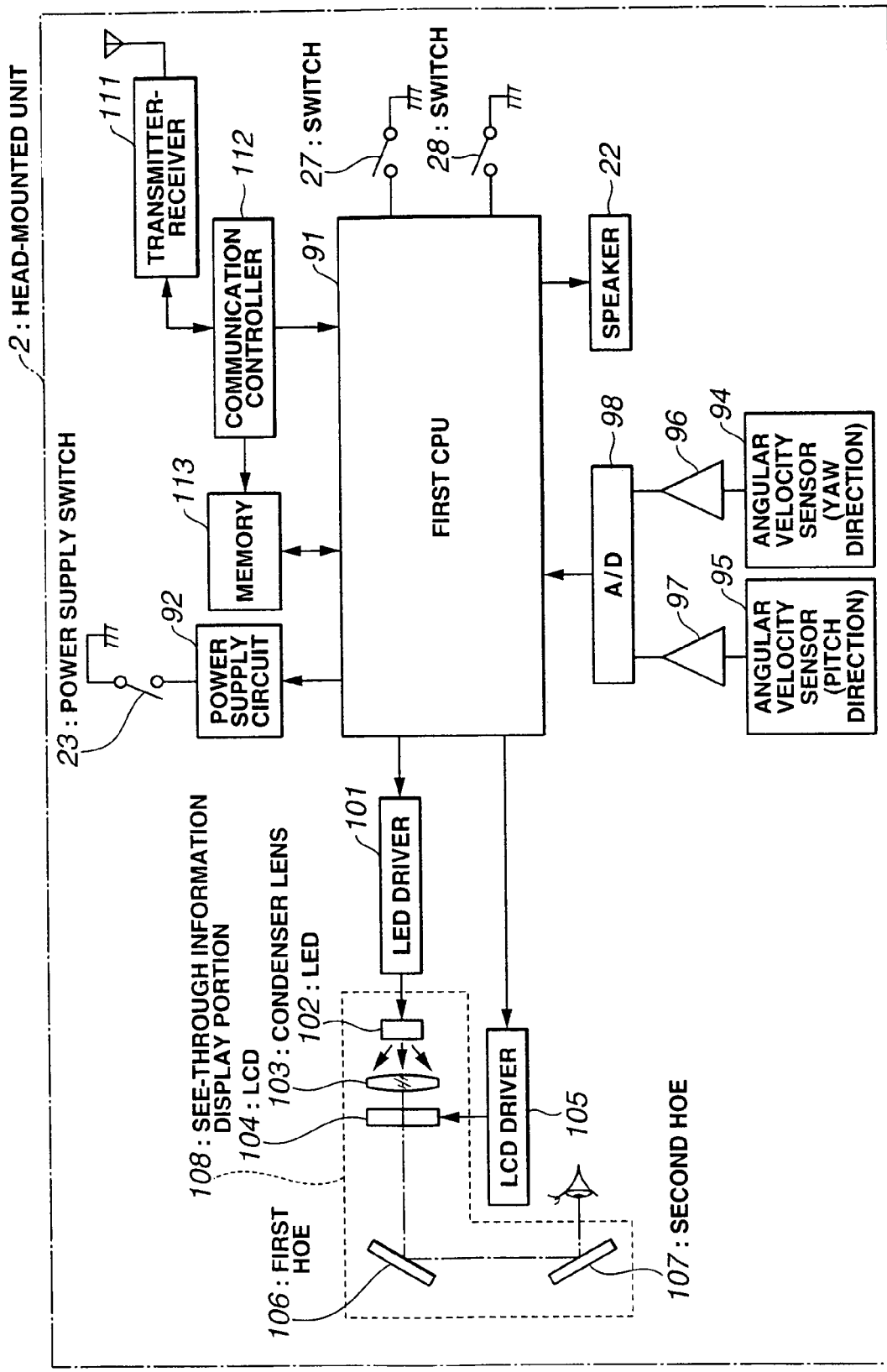
FIG. 13 is a block diagram mainly illustrating electronic circuits of the head-mounted unit in the information display apparatus according to the first embodiment.

FIG. 13 is a block diagram mainly showing the configuration of an electronic circuit of the head-mounted unit 2 in the information display apparatus 1.

The head-mounted unit 2 includes a transmitter-receiver 111, a communication controller 112, a memory 113, the switches 27 and 28, the speaker 22, angular velocity sensors 94 and 95, amplifies 96 and 97, an A/D converter 98, an LED driver 101, an LED 102, a condenser lens 103, the LCD 104, an LCD driver 105, a first holographic optical element (referred to as an HOE (Holographic Optical Element)) 106, a second HOE 107, a power supply circuit 92, a power supply switch 23, and a first CPU 91.

Hereinafter, a unit constituted of the LED 102, the condenser lens 103, the LCD 104, the first HOE 106, and the second HOE 107 is referred to as a see-through information display portion 108. The see-through information display portion 108 constitutes first displaying means.

The transmitter-receiver 111 receives various signals, such as display data and sound data, transmitted from the main unit 3 by radio or transmits various signals to the main unit 3 by radio so as to serve a double purpose of first transmitting means and first receiving means.

The communication controller 112 is communication controlling means composed of a receiver unit receiving data from the main unit 3 via the transmitter-receiver 111 for controlling and a transmitting unit transmitting data to the main unit 3 via the transmitter-receiver 111 for controlling so as to constitute the first transmitting means and the first receiving means.

First, the receiver unit of the communication controller 112 fetches data for one slot at a predetermined timing from received data supplied from a modem built in the transmitter-receiver 111. The receiver unit extracts a synchronizing signal from the data so as to generate a frame synchronizing signal for descrambling. Then, the receiver unit transmits display data transmitted from the main unit 3 and display control data of the head-mounted unit (a display start signal and a display off signal, for example) to the first CPU 91.

Next, the transmitting unit of the communication controller 112 adds a synchronizing signal to angular velocity information (or angular information calculated based on the angular velocity information) outputted via the first CPU 91 after applying scramble thereto. Then, the transmitting unit generates transmitting data for one slot so as to insert it into a predetermined slot within a frame for sending to a modem in the transmitter-receiver 111.

The memory 113 is storing means for temporarily storing display data and sound data received from the main unit 3, or capable of temporarily storing data also for transmitting to the main unit 3. The memory 113 is connected to the first CPU 91.

The switches 27 and 28 are used for detecting an open/close state of the temples 12 as mentioned above.

The speaker 22, as mentioned above, is sound generating means for generating sounds so as to be heard by a user mounting the head-mounted unit 2 at the left ear, for example.

The angular velocity sensor 94 is angular velocity detecting means for detecting an angular velocity in a yaw direction (lateral direction) of an observer head mounting the head-mounted unit 2.

The angular velocity sensor 95 is angular velocity detecting means for detecting an angular velocity in a pitch direction (front/back direction) of an observer head mounting the head-mounted unit 2.

The amplifier 96 is amplifying means for amplifying the output of the angular velocity sensor 94.

The amplifier 97 is amplifying means for amplifying the output of the angular velocity sensor 95.

The A/D converter 98 is used for converting an analog output from the angular velocity sensor 94 amplified by the amplifier 96 and an analog output from the angular velocity sensor 95 amplified by the amplifier 97 into digital signals, respectively, so as to send them to the first CPU 91.

The LED driver 101 is emission controlling means for controlling the LED 102 to emit light based on the control of the first CPU 91.

The LED 102 is an emitting source for emitting light driven by the LED driver 101, and constitutes displaying means.

The condenser lens 103 is used for condensing light emitted from the LED 102, and constitutes displaying means.

The LCD 104 is a display element made of transmission liquid crystal for displaying information such as images, and is configured by two-dimensionally arranging a plurality of display pixels at equal intervals. The LCD 104 constitutes the displaying means, and is illuminated with light of the LED 102 via the condenser lens 103 from the back face.

The LCD driver 105 is display controlling means for displaying various kinds of information, such as characters and images, transmitted from the main unit 3 by transmitting a drive signal to the LCD 104 based on the control of the first CPU 91.

The first HOE 106 is a reflection optical member for reflecting light emitted via the LCD 104 vertically downward (see FIG. 16A) while correcting aberration as will be described later, and constitutes the displaying means.

The second HOE 107 is a combiner configured so that information, such as characters and images, displayed on the LCD 104 is observably projected by reflecting and diffracting light from the first HOE 106 toward eyes of an observer while outside light is allowed to permeate toward eyes of the observer, and constitutes the displaying means.

The power supply circuit 92 is a first electric power source including a control circuit for supplying electric power to the entire head-mounted unit 2 and a battery. Upon receiving a power supply instruction signal from the main unit 3 via the first CPU 91, electric power from the battery is automatically supplied to the entire head-mounted unit 2.

The power supply switch 23 is used for turning on/off the power source of the head-mounted unit 2 as described with reference to FIG. 3.

The first CPU 91 is controlling means for mainly. controlling the head-mounted unit 2 while communicating with the second CPU 71 of the main unit 3. The first CPU 91 also serves as angular detecting means for detecting an angle of inclination of an observer head based on angular velocity information outputted from the angular velocity sensors 94 and 95.

As described above, operations of the head-mounted unit 2 and the main unit 3 are roughly as follows.

First, when the first power supply switch 43 is pushed by opening the upper casing 31, the information display apparatus 1 serves as an information input device. Hence, electricity is not passed through the second operating switch 73, the D/A converter 79, the LCD 51, and the LCD driver 81 which are circuits operating only when the information display apparatus 1 is used for a below-mentioned playback device. Thereby, the electric power for circuits not used for the information input device is suppressed against being consumed in vain.

When a signal of the turning-on of the first power supply switch 43 (supply initiation signal) is detected, the second CPU 71 transmits this signal (power feed instruction signal) to the head-mounted unit 2 via the communication controller 77 and the transmitter-receiver 76.

Then, the head-mounted unit 2 receives the power feed instruction signal from the main unit 3 via the transmitter-receiver 111 and the communication controller 112 so as to transmit it to the first CPU 91.

Upon receiving the power feed instruction signal, the first CPU 91 transmits a predetermined signal to the power supply circuit 92, so that the power supply circuit 92 starts supplying the electric power to the entire head-mounted unit 2. Also, the first CPU 91 transmits a receive confirmation signal to the main unit 3 via the transmitter-receiver 111 for confirming that the power feed instruction signal is received.

In addition, in order to allow the power for the head-mounted unit 2 to be turned on operatively in association with the turning on of the power for the main unit 3, it is necessary that at least the first CPU 91, the communication controller 112, and the transmitter-receiver 111 must be in a state capable of receiving a signal from the second CPU 71. Accordingly, while the power supply switch 23 is turned on, the minimum required power amount is to be supplied to these circuits. Whereas, while the power supply switch 23 is turned off, the power supply to the first-CPU 91, the communication controller 112, and the transmitter-receiver 111 is also shut off. That is, when the power supply switch 23 is opened (turned off), the power supply for the head-mounted unit 2 is entirely turned off, so that the power supply control in operatively association with the first power supply switch 43 is obviously not performed.

In such a manner, when the power supply is turned on for the head-mounted unit 2 in operatively association with the turning on of the power for the main unit 3, it is necessary to turn on the power supply switch 23 in advance. In this case, although some amount of electric power is steadily consumed, the operation is advantageously simplified because of no need for operation of the power supply switch 23.

Also, the second CPU 71 of the main unit 3 monitors whether a predetermined time is lapsed after the power supply for the head-mounted unit 2 is turned on. If it is determined that the predetermined time is lapsed, a predetermined power supply-off signal is transmitted to the head-mounted unit 2 from the main unit 3. Thereby, when the predetermined time is lapsed, the power supply for the head-mounted unit 2 is automatically turned off.

Then, in a state that the upper casing 31 is opened (see FIG. 10), the information display apparatus 1 has the same function as that of word processing software (or character input software) in a general personal computer.

That is, upon operating the first operating switch 72, character information is read out of the character generator 74 corresponding to the operation, so that document data is edited by the second CPU 71.

The edited data is transmitted to the head-mounted unit 2 via the communication controller 77 and the transmitter-receiver 76 with a display frame added thereto as will be described later so as to be displayed at a predetermined position of the LCD 104 of the head-mounted unit 2 by controlling the display position. In addition, the predetermined position of the LCD 104 of the head-mounted unit 2 is defined corresponding to the inclination in yow and pitch directions calculated based on the head angular velocity information transmitted from the head-mounted unit 2.

The head-mounted unit 2 receives the document data which is defined at the display position and has the display frame added thereto transmitted from the main unit 3 via the transmitter-receiver 111 and the communication controller 112. Then, the data is temporarily stored in the memory 113.

The document data stored in the memory 113 is transmitted to the LCD driver 105 via the first CPU 91 so as to be displayed by the LCD 104.

Simultaneously, the first CPU 91 allows the LED 102 to emit light by driving the LED driver 101. Light emitted from the LED 102 is collimated through the condenser lens 103 so as to irradiate the LCD 104 from the back face.

In such a manner, the light passing through the LCD 104 is reflected by the first HOE 106 so as to be incident on eyes of an observer via the second HOE 107 as a combiner. The observer can thereby observe the document data as virtual images superimposed on ambient images.

Then, as shown in FIG. 11, when the second power supply switch 44 is closed (turned on) in a state that the upper casing 31 is closed and the intermediate casing 32 is opened, the information display apparatus 1 serves as the playback device. As described above, while the second power supply switch 44 is closed, electricity is allowed to pass through circuits other than predetermined part of the circuits including at least the first operating switch 72.

The relationship between the operation of the second power supply switch 44 and the power supply control of the head-mounted unit 2 operated in association with the switch operation is the same as that between the operation of the first power supply switch 43 and the power supply control of the head-mounted unit 2 operated in association with the switch operation.

By operating the menu button 53, the menu select switches 56, 57, 58, and 59, and the determination switch 55 included in the second operating switch 73, information already stored in the record memory 83 or the hard disk 85 is selected. Furthermore, when the playback/stop switch 61 is operated so as to instruct the playback, the following procedure will be executed.

First, if the information stored in selected one of the record memory 83 and the hard disk 85 is image data, the data is expanded by the expansion circuit unit within the compression/expansion circuit 82 so as to be temporarily stored in the main unit memory 78.

On the other hand, when the information stored in selected one of the record memory 83 and the hard disk 85 is character data, this data is temporarily stored in the main unit memory 78 without the compression/expansion circuit 82 therebetween.

The information stored in the main unit memory 78 is converted into an analog image signal by the D/A converter 79, and then is displayed on the LCD 51 or transmitted to the head-mounted unit 2 and displayed on the LCD 104 of the see-through information display portion 108. At this time, the operation of the LCD 51 is controlled by a drive signal generated from the LCD driver 81 based on the instruction of the second CPU 71.

At present, if the information display apparatus 1 is set in the first display mode (i.e., the mode displayed on the LCD 51 of the main unit 3) by the display select switch 64 shown in FIG. 11, the information display apparatus 1 is operated as follows.

First, when the second operating switch 73 is operated in a predetermined manner, various kinds of information, such as characters, sounds, and images, stored in the record memory 83 or the hard disk 85 are selected by the select circuit 84 so as to be temporarily stored in the main unit memory 78.

Among these various kinds of information, display data, such as images and characters, are converted into analog data by the D/A converter 79, and then displayed on the LCD 51 based on the control of the LCD driver 81.

Among them, sound data is played back through the speaker 52 based on the control of the second CPU 71.

On the other hand, if the information display apparatus 1 is set in the second display mode (i.e., the mode displayed on the LCD 104 of the head-mounted unit 2) by the display select switch 64, the information display apparatus 1 is operated as follows.

First, when the second operating switch 73 is operated in a predetermined manner, various kinds of information, such as characters, sounds, and images, stored in the record memory 83 or the hard disk 85 are selected by the select circuit 84 so as to be temporarily stored in the main unit memory 78.

Among these various kinds of information, display data, such as images and characters, are transmitted to the head-mounted unit 2 via the communication controller 77 and the transmitter-receiver 76 with a display frame added thereto as will be described later so as to be displayed at a predetermined position of the LCD 104 of the head-mounted unit 2 by controlling the display position. As described above, the predetermined position of the LCD 104 is defined corresponding to the head inclination in yaw and pitch directions calculated based on head angular velocity information (or angular information) transmitted from the head-mounted unit 2. Then, the head-mounted unit 2 receives these various kinds of information via the transmitter-receiver 111 and the communication controller 112 so as to temporarily store it in the memory 113. Then, the information such as an image and a character is displayed by the see-through information display portion 108.

Among these various kinds of information, sound data is transmitted to the head-mounted unit 2 via the communication controller 77 and the transmitter-receiver 76. The head-mounted unit 2 receives the various kinds of information via the transmitter-receiver 111 and the communication controller 112 in the same way as in the display data, and temporarily stores it in the memory 113. Then, the sound data is played back through the speaker 22 based on the control of the first CPU 91.

Figure 14:
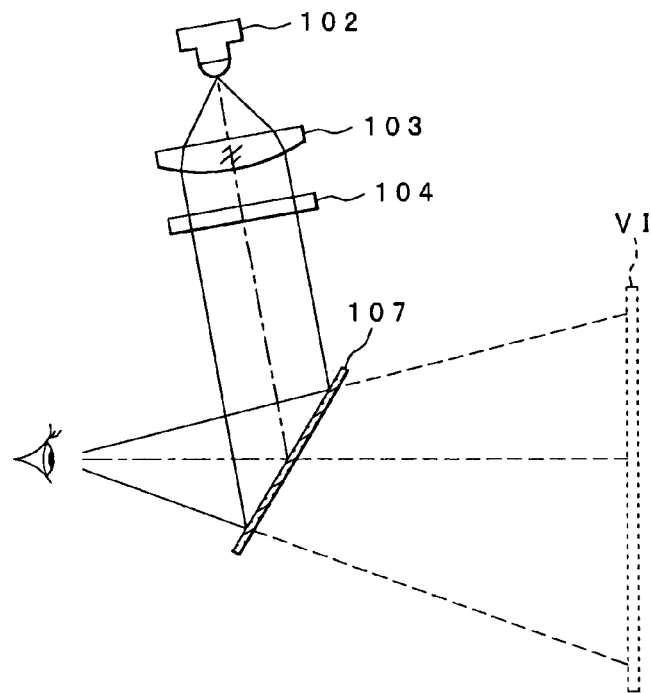
FIG. 14 is an explanatory view illustrating the principle of an optical system of a see-through information display portion according to the first embodiment.
Figure 15:
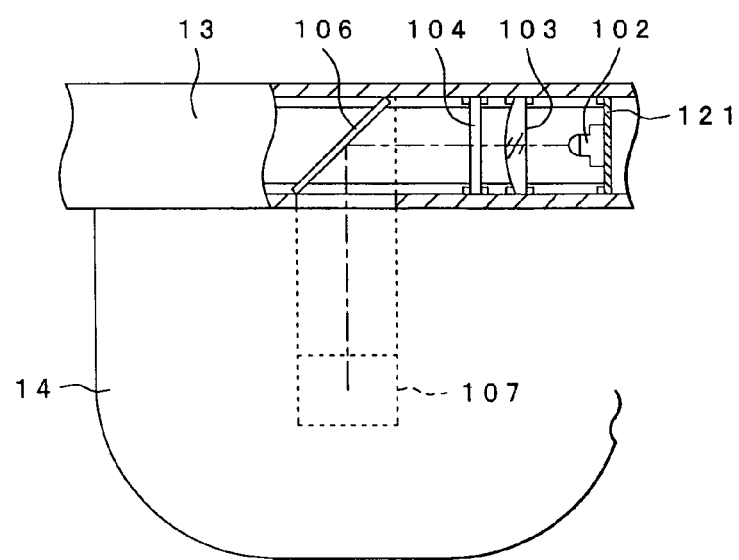
FIG. 15 is a front view including a partial section showing the configuration of the optical system of the see-through information display portion according to the first embodiment.
Figure 16A:
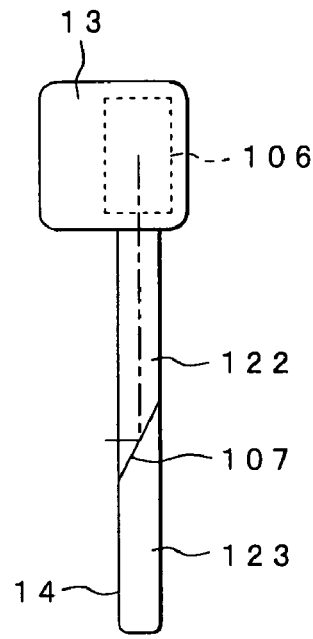
FIGS. 16A and 16B are left side views showing a configuration example of the optical system of the see-through information display portion according to the first embodiment.
Figure 16B:
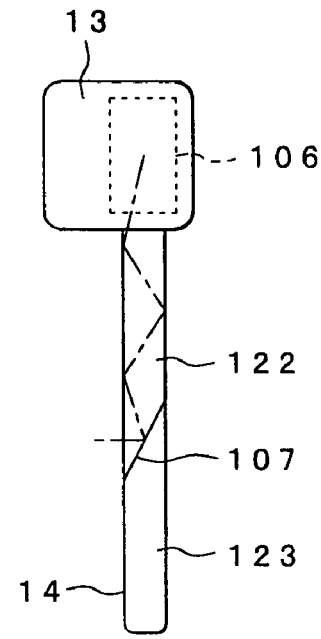
Figure 17:
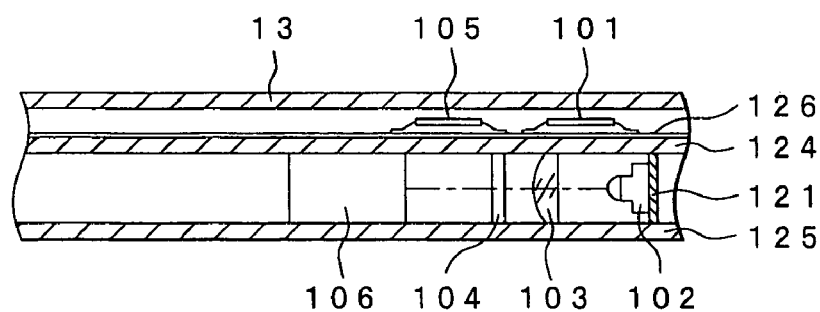
FIG. 17 is a planar sectional view showing the configuration of the optical system of the see-through information display portion according to the first embodiment.

Subsequently, with reference to FIGS. 14 to 17, the optical configuration of the see-through information display portion will be mainly described. FIG. 14 is a drawing illustrating the principle of the optical system of the see-through information display portion; FIG. 15 is a front view including a partial section showing the configuration of the optical system of the see-through information display portion; FIGS. 16A and 16B are left side views showing a configuration example of the optical system of the see-through information display portion; and FIG. 17 is a planar sectional view showing the configuration of the optical system of the see-through information display portion.

The see-through information display portion 108 can display information, such as characters and images, and a display frame showing a display range by superimposing them as virtual images on an object to be substantially directly observed by a photographer. Such a display is referred to as a see-through display below. In addition, "substantially directly observing" includes not only observing with naked eyes but also observing through a planar transparent member made of glass or plastics and lenses for eyesight-correcting.

First, with reference to FIG. 14, the display principle of see-through images by an optical system of the see-through information display portion 108 according to the first embodiment (referred to as a see-through information display optical system below) will be described.

The light emitted from the LED 102 is condensed by the condenser lens 103 so as to illuminate the LCD 104 from the back face. The LED 102 is composed of three-color light-emitting diodes of R (red), G (green), and B (blue). When color images are displayed, all three colors are used; only one color, such as G (green), may be radiated when characters or the display frame are displayed.

The first CPU 91 generates a signal corresponding to the display frame showing a display range so as to output to the LCD driver 105. The LCD driver 105 displays characters and images on the LCD 104 by driving the LCD 104 based on the signal.

The characters and images emitted from the LCD 104 by receiving light of the LED 102 are led to eyes of an observer after being reflected by the second HOE 107. In such a manner the observer can observe the characters and images as virtual images VI. In addition, as FIG. 15 is illustrating the principle, the first HOE 106 is not shown.

The second HOE 107 is a volume phase holographic optical element using a sensitive material, such as a photopolymer and bichromic acid gelatin, and is designed to have characteristics that reflect light at the maximum reflectance in each of wavelengths of R, G, and B emitted from the LED 102. Accordingly, if G light is emitted when characters and images are displayed, green characters and images are clearly displayed as virtual images. The HOE has excellent wavelength selectivity, so that while exhibiting high reflection characteristics for very narrow wavelength intervals of each of the wavelengths of R, G, and B, the HOE has high permeation characteristics for beams with wavelengths other than those. Therefore, while external light with the same wavelength range as that of display light is diffracted and reflected so as not to reach pupils of an observer, external light with wavelength ranges other than that reaches the pupils of the observer. In general, visible light has a wide band width of the wavelength, so that although light with very narrow wavelength intervals including each of the wavelengths of R, G, and B does not reach the observer, the external images can be observed without hindrance.

The first HOE 106 not only reflects light from 104 so as to lead it to the second HOE 107 but also has a function for correcting a curvature of field. According to the embodiment, the first HOE 106 is used; instead, an optical element with a free-form surface may be used. Since the optical element with a free-form surface can correct complicated aberrations with small size and weight, clear images with small aberration can be displayed without too much increasing its weight.

Subsequently, with reference to FIGS. 15 to 17, a specific arrangement example of the see-through information display optical system will be described.

At positions within the frame portion 13 in the object side and on the transparent optical member 14 (or the transparent optical member 15), the LED 102, the condenser lens 103, the LCD 104, and the first HOE 106 are arranged in the order of FIG. 15. These members, as shown in FIG. 17, are attached and sandwiched between holding frames 124 and 125. At this time, the LED 102 is fixed to the holding frames 124 and 125 in a state mounted on an electric circuit board 121. Among them, the first HOE 106 is inclined so as to reflect the light from the LED 102 vertically downward, as described above.

The transparent optical member 14 (or the transparent optical member 15), as shown in FIGS. 16A and 16B, includes light guide members 122 and 123 made of transparent glass or plastics so as to have a predetermined thickness and the second HOE 107 sandwiched between the light guide members 122 and 123 and inclined so as to reflect light rearward. In such a structure, the light reflected from the first HOE 106 passes through the light guide member 122 arranged on the second HOE 107 so as to reach the second HOE 107. The light propagation within the light guide-member 122 may be only permeation as shown in FIG. 16A or it may be a combination of the permeation and the total reflection on the internal surface as shown in FIG. 16B. The optical design shown in FIG. 16B enables the transparent optical member 14 (or the transparent optical member 15) to be reduced in thickness, so that the head-mounted unit 2 can be further reduced in weight.

At a position within the frame portion 13 in the head side of a photographer (opposite to the object to be observed), as shown in FIG. 17, an electric circuit board 126 mounting the LED driver 101 and the LCD driver 105 thereon is arranged opposite to the see-through information display optical system with the holding frame 124 therebetween.

In addition, the see-through information display optical system includes the LED 102, the condenser lens 103, the LCD 104, the first HOE 106, the second HOE 107, and the light guide members 122 and 123 among those members described above.

Since an observer generally observes an object with both eyes, as to the arrangement of the see-through information display portion 108, two examples may be assumed as follows.

First, in a first example, a portion corresponding to one eye of both the eyes is configured of the see-through information display optical system shown in FIG. 15 while a portion corresponding to the other eye is configured by a simple transparent optical member without a see-through information display function. In this case, the transparent optical member corresponding to the other eye may preferably have the same luminous transmittance characteristics as those of the transparent optical member 14 (or the transparent optical member 15). Thereby, tiredness of the eyes can be reduced even in a long time use.

Then, in a second example, for each of both eyes, the see-through information display optical system shown in FIG. 15 is configured. When such a pair of see-through information display optical systems are used, tiredness of the eyes can be further reduced as well as stereo images can be displayed on demand.

Figure 18:
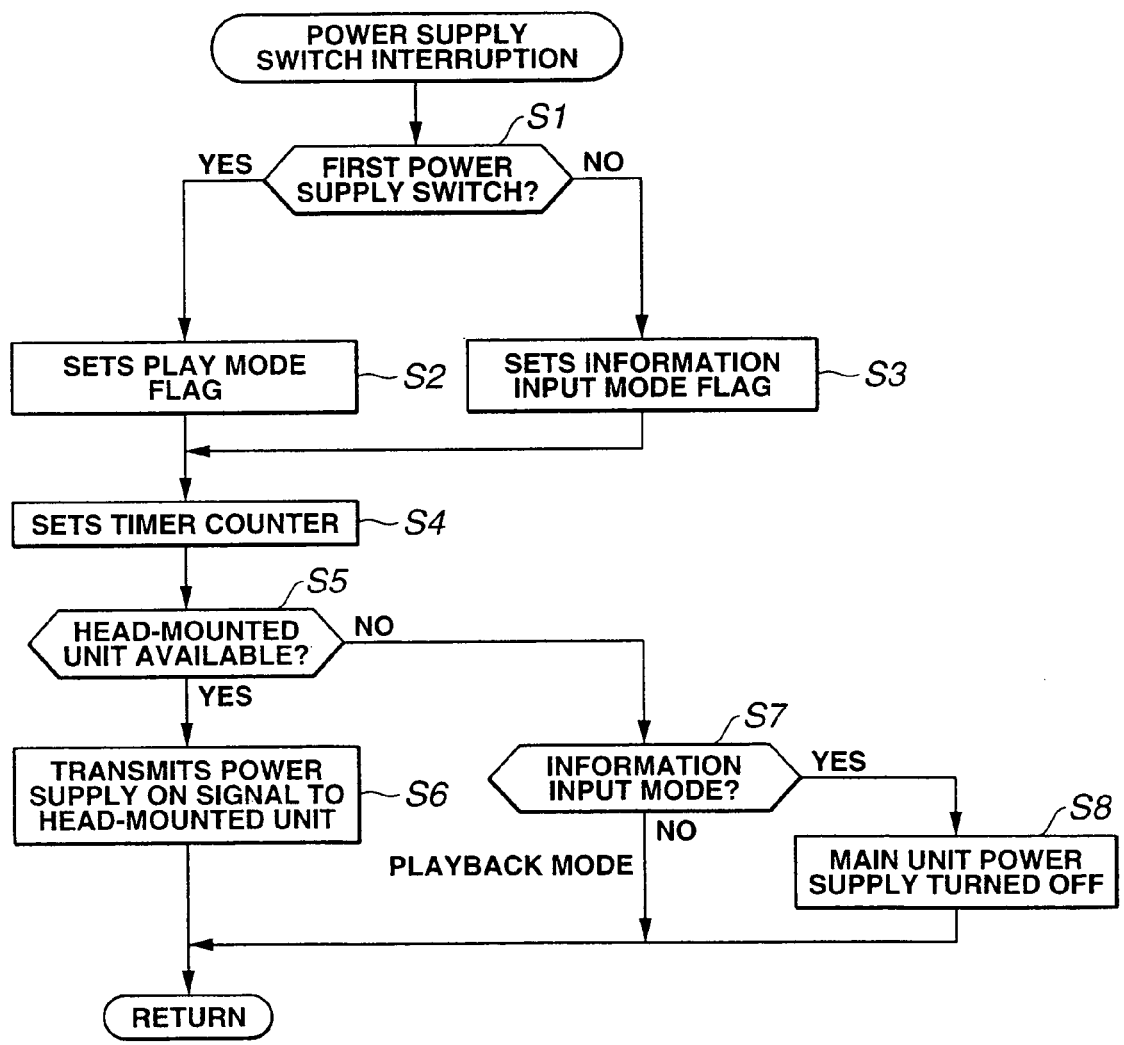
FIG. 18 is a flowchart illustrating a flow of power supply control in the information display apparatus according to the first embodiment.

Then, FIG. 18 is a flowchart illustrating a flow of power supply control in the information display apparatus 1.

Upon operating the first power supply switch 43 or the second power supply switch 44, the interrupt handling of the power supply switch is carried out.

Upon initiating the handling, the second CPU 71 determines whether the switch turned on is the first power supply switch 43 or not (Step S1).

When the switch turned on is the first power supply switch 43, a flag (playback mode flag) is established showing the playback mode is selected so as to allow the information display apparatus 1 to function as the playback device (Step S2).

Also, when the switch turned on is the second power supply switch 44, a flag (information input mode flag) is established showing the information input mode is selected so as to allow the information display apparatus 1 to function as the information input device (Step S3).

When the flag in Step S2 or Step S3 is established, a timer counter for counting a time elapsed from the turning-on of the first power supply switch 43 or the second power supply switch 44 (the counter is built in the second CPU 71) is set (Step S4).

Subsequently, the head-mounted unit 2 is determined whether it is available or not (Step S5). As described above, it is determined that the head-mounted unit 2 is unavailable if no signal is replied when a predetermined confirming signal is transmitted to the head-mounted unit 2. If a signal is replied from the head-mounted unit 2, it is determined whether the head-mounted unit 2 is unavailable or available corresponding to the replied content. When a signal is replied, the signal in what state shows the head-mounted unit 2 is available or unavailable is as described above.

In Step S5, when the head-mounted unit 2 is determined available, a power supply turning-on signal (power supply instruction signal) is then transmitted to the head-mounted unit 2 so as to return to a predetermined parent routine (Step S6). The electric power is thereby supplied for the entire head-mounted unit 2. As described above, because while the power supply switch 23 of the head-mounted unit 2 is opened, the power supply of the head-mounted unit 2 is in a forcedly turned-off state, in order to make the power supply from the power supply circuit 92 of the head-mounted unit 2 operate in operatively association with the first power supply switch 43 or the second power supply switch 44 of the main unit 3, it is necessary to close (turn-on) the power supply switch 23 in advance.

On the other hand, at Step S5, when the second CPU 71 determines that the head-mounted unit 2 is in an unavailable state, the second CPU 71 then determines whether the head-mounted unit 2 is in the information input mode or not (Step S7). This determination is carried out based on the flag established at Step S2 or Step S3.

When the information input mode is determined, since there is no means for visually confirming the information inputted from the main unit 3 in the state shown in FIG. 10 (i.e., since the LCD 51 of the main unit 3 in the state of FIG. 10 cannot be used because the head-mounted unit 2 is turned off), the power supply of the main unit 3 is turned off (Step S8). In addition, according to the embodiment, the power supply of the main unit 3 is turned off; it is not limited to this, and the main unit 3 may be set in the low power consumption mode (stand-by state).

At Step S7, if the information input mode is not determined, that is, the playback mode is determined, the processing is finished and it returns to the predetermined parent routine.

As described above, the information input mode is effected only when the main unit 3 and the head-mounted unit 2 integrally function, so that when the head-mounted unit 2 is unavailable, the power supply of the main unit 3 is instantly turned off (Step S7 and Step S8). By such control, the useless power consumption is suppressed. Also even when the power supply of the main unit 3 is turned on by carelessly operating the first power supply switch 43 or the second power supply switch 44, the electric power supply is automatically suppressed, so that the waste of the electric power can be suppressed.

While the information display apparatus 1 is in the playback mode, the main unit 3 can also be used individually, so that even if the head-mounted unit 2 is unavailable, the power supply of the main unit 3 is remained in the turned-on state. At this time, it is just not to transmit the power supply turning-on signal to the head-mounted unit 2 from the main unit 3.

In such a manner, according to the information display apparatus 1 described above, the power source can be appropriately supplied to the head-mounted unit 2 and the main unit 3 only by simple operation.

Figure 19:
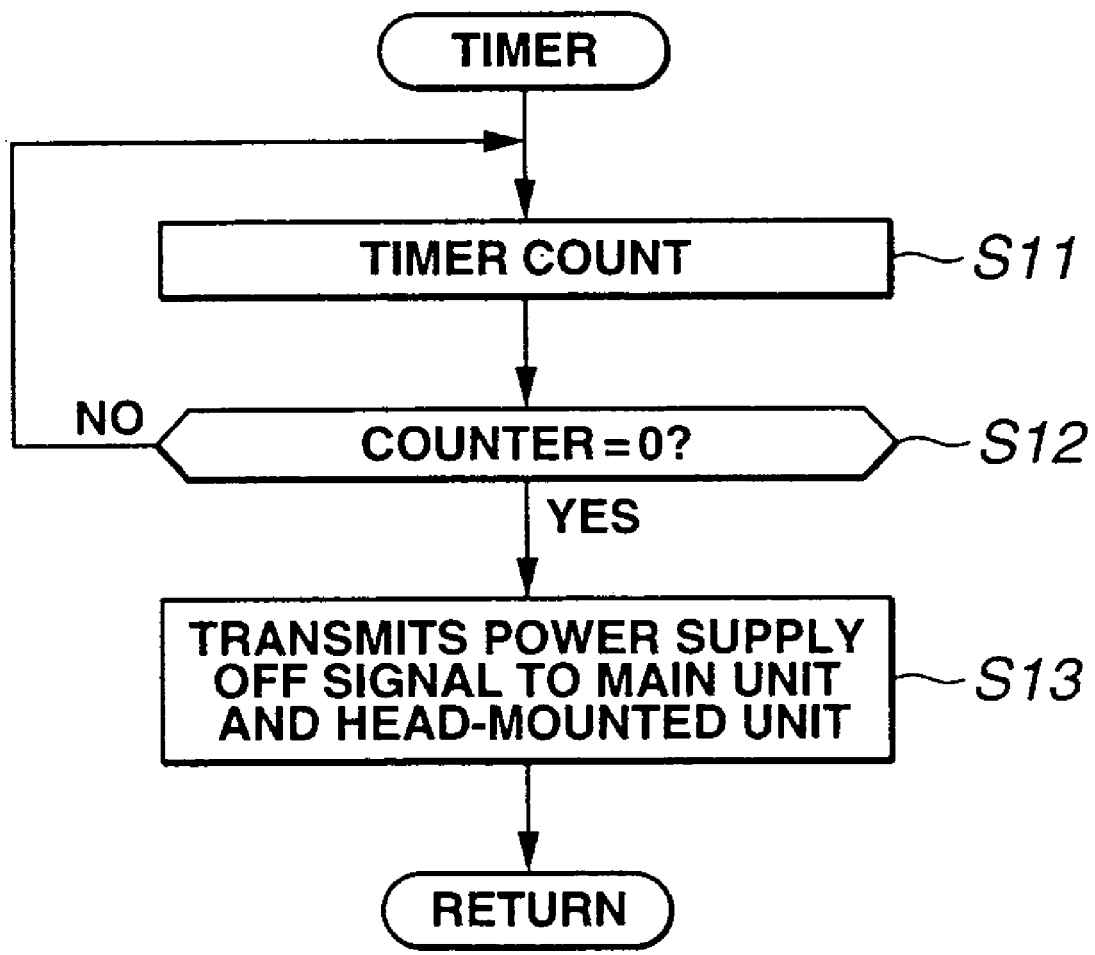
FIG. 19 is a flowchart illustrating operation of a timer counter according to the first embodiment, for controlling the time of the electric power supply to the head-mounted unit and the main unit.

FIG. 19 is a flowchart illustrating operation of the timer counter for controlling the time of the electric power supply to the head-mounted unit 2 and the main unit 3.

Upon starting this processing, the timer counter set at Step S4 is down-counted at a predetermined time intervals (Step S11).

Then, the counter value is determined if it becomes zero (Step S12).

Until the counter value becomes zero, the timer counter is down-counted with predetermined time intervals by returning the process to Step S11.

At Step S12, when the counter value becomes zero, the second CPU 71 transmits the power supply turning-off signal to the power supply circuit 75 of the main unit 3 and the head-mounted unit 2 (Step S13).

When the head-mounted unit 2 receives the power supply turned-off signal from the main unit 3, the first CPU 91 transmits the power supply turning-off signal to the power supply circuit 92. Thereby, the power supply from the power supply circuit 92 to the circuits within the head-mounted unit 2 is reduced or turned off, so that the first CPU 91 itself becomes the stand-by state.

Similarly, in also the main unit 3, the second CPU 71 transmits the power supply turning-off signal to the power supply circuit 75, so that the power supply from the power supply circuit 75 to the circuits within the main unit 3 is reduced or turned off, and the second CPU 71 itself becomes the stand-by state.

Figure 20:
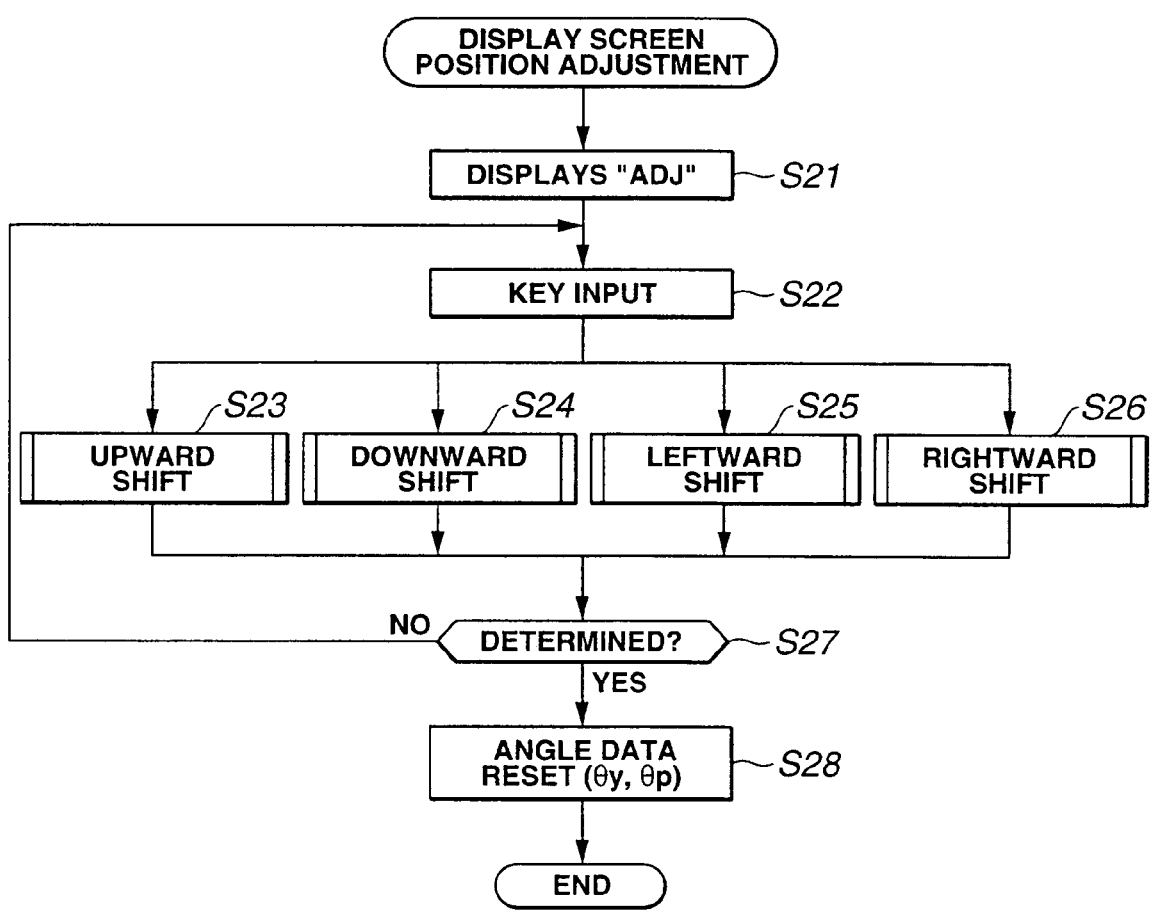
FIG. 20 is a flowchart illustrating an adjustment process of an initial position of a display screen according to the first embodiment.
Figure 21:
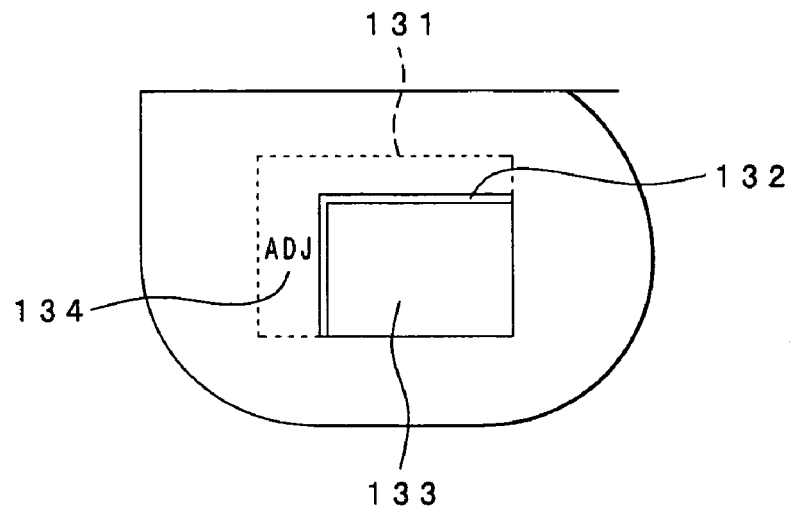
FIG. 21 is a drawing of a display example when adjusting the initial position of the display screen according to the first embodiment.
Figure 22:
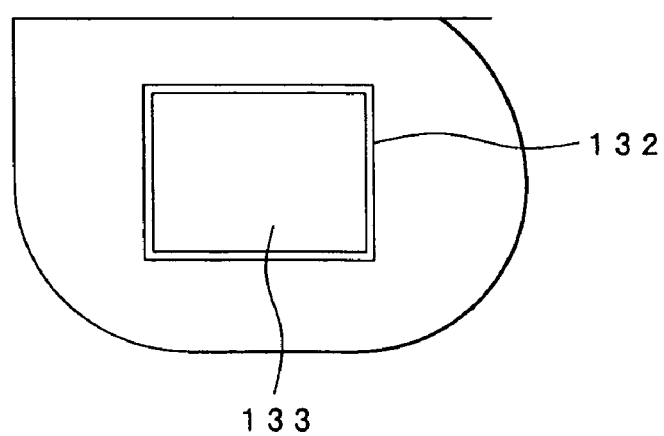
FIG. 22 is a drawing of a display example when the initial position of the display screen according to the first embodiment has been adjusted.

Subsequently, FIG. 20 is a flowchart illustrating an adjustment process of an initial position of a display screen. The process of FIG. 20 will be described with reference to FIGS. 21 and 22. FIG. 21 is a drawing of a display example when adjusting the initial position of the display screen; and FIG. 22 is a drawing of a display example when the initial position of the display screen has been adjusted.

The information display apparatus 1 according to the embodiment can display information on the head-mounted unit 2 as if the display image were fixed to the external world (just like an observer watches a stationary monitor or TV set, for example) regardless of the movement of the head of an observer. Hence, if the observer tilts the head, the image is shifted corresponding to the movement in real time by the displacement amount corresponding to the head inclination in the opposite direction. The process shown in FIG. 20 is of the adjustment in which an inclination angle of the head is determined as a reference to shift the image. Thereby, the display screen can be watched as if a virtual stationary monitor were installed at the optimum observing position.

At a time when the observer just faces the front, the screen like in FIG. 21 is displayed. In FIG. 21, a displayable range 131 is indicated by a dotted line, and a display frame 132 is displayed at a lower right position within the displayable range 131. Inside the display frame 132, a display screen 133 is provided.

In such a state, when the observer sets the information display apparatus 1 in an adjustment mode by predetermined key operation using the first operating switch 72 and the second operating switch 73 of the main unit 3, an "ADJ" character 134 is displayed at a position on the left within the displayable range 131 for showing the adjustment mode, as shown in FIG. 21 (Step S21).

Then, when predetermined horizontal and vertical keys of the main unit 3 (the menu select switches 56, 57, 58, and 59 shown in FIG. 11 or the pad-type pointing device 46 shown in FIG. 10, for example) are operated, the second CPU 71 detects this key entry (Step S22). While the key entry continues, display information is generated showing the shifting of the display frame 132 and the display screen 133 by key operation at a predetermined movement speed in an instructed direction so as to be written in the main unit memory 78.

That is, when the upward key operation is detected, display data is produced so as to move the display frame 132 and the display screen 133 at a predetermined moving speed in the upward direction within the displayable range 131 while the key is operated, and the display data is written in the main unit memory 78. Thereby, the data in the main unit memory 78 is transmitted to the head-mounted unit 2 by radio, so that images moved upward within the displayable range 131 are displayed by the head-mounted unit 2 (Step S23).

Also, when the downward key operation is detected, display data is produced so as to move the display frame 132 and the display screen 133 at a predetermined moving speed in the downward direction within the displayable range 131 while the key is operated, and the display data is written in the main unit memory 78. Thereby, the data in the main unit memory 78 is transmitted to the head-mounted unit 2 by radio, so that images moved downward within the displayable range 131 are displayed by the head-mounted unit 2 (Step S24).

Furthermore, when the leftward key operation is detected, display data is produced so as to move the display frame 132 and the display screen 133 at a predetermined moving speed in the leftward direction within the displayable range 131 while the key is operated, and the display data is written in the main unit memory 78. Thereby, the data in the main unit memory 78 is transmitted to the head-mounted unit 2 by radio, so that images moved leftward within the displayable range 131 are displayed by the head-mounted unit 2 (Step S25).

Then, when the rightward key operation is detected, display data is produced so as to move the display frame 132 and the display screen 133 at a predetermined moving speed in the rightward direction within the displayable range 131 while the key is operated, and the display data is written in the main unit memory 78. Thereby, the data in the main unit memory 78 is transmitted to the head-mounted unit 2 by radio, so that images moved rightward within the displayable range 131 are displayed by the head-mounted unit 2 (Step S26).

Upon completing any one of Steps S23 to S26, a predetermined confirmation operation (the operation of the determination switch 55 shown in FIG. 11 or the clicking of the left button 47 shown in FIG. 10, for example) is waited (Step S27). Until the confirmation is operated, the key entry is continuously performed back to Step S22.

On the other hand, when the confirmation is operated, the position of the display frame 132 is settled. Simultaneously, the "ADJ" character 134 for showing the adjustment mode vanishes. Thereby, the display frame 132 and the display screen 133 in the state shown in FIG. 22 are displayed as virtual images.

Then, head angular data in yaw and pitch directions $\theta y$ and $\theta p$ calculated based on the outputs from the angular velocity sensors 94 and 95 is reset (Step S28) so as to complete the positional adjustment of the display screen.

By such adjustment, while positions of the display frame 132 and the display screen 133 in the initial state are settled, the head angular data $\theta y$ and $\theta p$ is measured thereafter using the initial state as a reference point.

In the examples of FIGS. 21 and 22, the display frame 132 is expressed clearly with a boundary line; however, it is not necessarily expressed clearly.

According to the embodiment, the adjustment of the initial position is performed by the process shown in FIG. 20; it is not limited to this. For example, when the head is inclined at a predetermined inclination (specifically, when an observer allows the head to be inclined at an angle desired at the initial position), the display screen may be settled at a predetermined position by a predetermined key entry (the operation of the determination switch 55 or the clicking of the left button 47, for example) while the angular data θy and θp may also be reset. By adopting such an operation system, the initial positions of the display frame 132 and the display screen 133 can be more simply adjusted.

Figure 23:
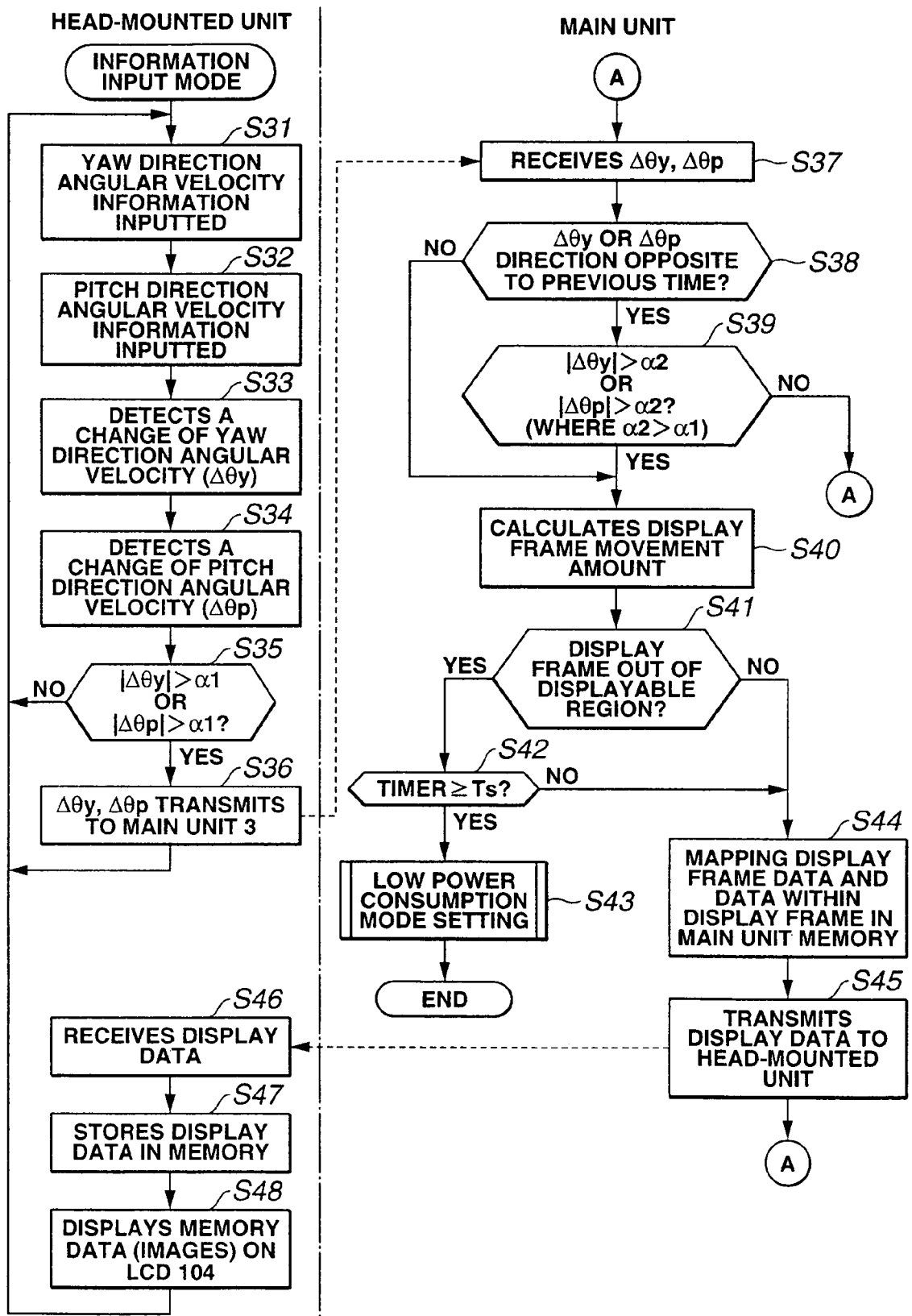
FIG. 23 is a flowchart of a process controlling the image display position when the information display apparatus according to the first embodiment is used in an information input mode.

Subsequently, FIG. 23 is a flowchart of a process controlling the image display position when the information display apparatus 1 is used in the information input mode. This information input mode, as mentioned above, is used for using the information display apparatus 1 as the information input device (see FIG. 10).

The process shown in FIG. 23 offers a feeling that as if an observer were observing a monitor fixed to the external world by shifting the image display region in a direction opposite to the head inclination angle.

When the monitor display region is shifted corresponding to the head inclination angle, there is no problem if the change in the display region follows the change in the head inclination angle smoothly at high speed; however, because the changing speed of the display region has a limit in practice, the changing smoothness of the display region may be impaired. So, according to the embodiment, the display region is to be changed only when the angular change is more than a predetermined value so as not to impair the smoothness extremely.

However, despite such a process, every time the head inclination angle is minutely changed, the display region is changed with a delay to some extent. In particular, when the changes are frequent, an observer may feel a sense of discomfort. And so, according to the embodiment, the threshold value of the change in the head inclination angle is varied to have a difference between when the head inclination is changing in a normal direction and directly after the head inclination is changed in the opposite direction. That is, by adding so-called hysteresis characteristics that the angular change directly after the detection of the angular change in the opposite direction is increased relative to the angular change in a normal direction for changing the display region, the sense of discomfort is alleviated (see below-mentioned Steps S35 to S40 and S44).

Furthermore, in order to reduce the head-mounted unit 2 in size and weight as much as possible, the calculation process in the head-mounted unit 2 is reduced.

That is, the head-mounted unit 2 mainly has the functions to receive predetermined display information from the main unit 3 so as to display the information on the see-through information display portion 108, to receive a sound signal from the main unit 3 so as to play back, and to detect an angular velocity of a head and a variation in the head inclination for a predetermined time so as to transmit the results to the main unit 3.

On the other hand, the main unit 3 mainly has the functions to read out information from a recording medium (the record memory 83 and the hard disk 85) having the information, such as sound signals, images, and characters, recorded thereon; to produce display data giving a sense just like watching a monitor fixed to the external world by processing display information among various kinds of information read out of the recording medium based on a head inclination angle so as to transmit the display data to the head-mounted unit 2; and to play back the sound signals and images recorded on the recording medium by the main unit 3 itself.

Such processing will be described in detail with reference to FIG. 23. In FIG. 23, the operation of the main unit 3 is shown on the right and the operation of the head-mounted unit 2 is shown on the left.

Upon initiating the processing, first, the angular velocity information in a yaw direction of an observer head detected by the angular velocity sensor 94 is inputted (Step S31) while the angular velocity information in a pitch direction of the observer head detected by the angular velocity sensor 95 is inputted (Step S32).

Then, the angular velocity in the yaw direction obtained at Step S31 is time-integrated so as to calculate an angular change in the yaw direction $\Delta\theta y$ [rad] (Step S33) while the angular velocity in the pitch direction obtained at Step S32 is time-integrated so as to calculate an angular change in the pitch direction $\Delta\theta p$ [rad] (Step S34).

In the example shown in FIG. 23, the angular changes $\Delta\theta y$ and $\Delta\theta p$ are calculated by the head-mounted unit 2, and then, the calculated angular changes $\Delta\theta y$ and $\Delta\theta p$ are transmitted to the main unit 3 (see below-mentioned Step S36); however it is not limited to this, so that the angular velocity information obtained from the angular velocity sensors 94 and 95 may be transmitted to the main unit 3 as it is so as to calculate the angular changes $\Delta\theta y$ and $\Delta\theta p$ in the main unit 3 based on the received angular velocity information. In this case, the processing load on the head-mounted unit 2 can be reduced.

Then, it is determined whether at least one of the absolute value of the angular change in the yaw direction $|\Delta\theta y|$ [rad] and the absolute value of the angular change in the pitch direction $|\Delta\theta p|$ [rad] within a predetermined time (duration) is larger than a predetermined value (a predetermined first threshold value) α1 or not. That is, it is determined whether at least one of $|\Delta\theta y|>\alpha 1$ and $|\Delta\theta p|>\alpha 1$ is established or not (Step S35).

When it is determined that at least one of $|\Delta\theta y|$ and $|\Delta\theta p|$ is larger than the predetermined value α1, the head-mounted unit 2 transmits data of $\Delta\theta y$ and $\Delta\theta p$ to the main unit 3 (Step S36).

After the processing of Step S36, the head-mounted unit 2 returns to Step S31 so as to repeat the operation described above.

On the other hand, the main unit 3 receives the data of $\Delta\theta y$ and $\Delta\theta p$ transmitted from the head-mounted unit 2 at Step S36 (Step S37).

Then, it is determined whether the received angular change $\Delta\theta y$ or $\Delta\theta p$ is in a direction opposite to that of the previously detected value (i.e., whether it differs in sign from the previously detected value) (Step S38). This processing determines whether the angular change in the head inclination remains in the normal direction or changes in the opposite direction.

When it is determined that the angular change is in the opposite direction at Step S38, it is further determined whether at least one of the absolute value of the angular change in the yaw direction $|\Delta\theta y|$ and the absolute value of the angular change in the pitch direction $|\Delta\theta p|$ is larger than a second predetermined value (a predetermined second threshold value) α2 or not (the second predetermined value α2 satisfies α2>α1). That is, it is further determined whether at least one of $|\Delta\theta y|>\alpha 2$ and $|\Delta\theta p|>\alpha 2$ is established or not (Step S39).

When it is determined that both $|\Delta\theta y|$ and $|\Delta\theta p|$ are smaller than the second predetermined value α2 at Step S39, the main unit 3 returns to Step S37 so as to repeat the operation described above.

When it is determined that at least one of |Δθy| and |Δθp| is larger than the second predetermined value α2 at Step S39, or when it is determined that the angular change is not in the opposite direction at Step S38 (i.e., the head inclination angle is changing in the normal direction), the displacement amount of the display frame 132 (and the display screen 133) corresponding to Δθy or Δθp is calculated (Step S40). The calculation of the displacement amount is performed by deriving from L×Δθy or L×Δθp, where L is the distance between observer eyes and the screen.

Then, based on the calculated displacement amount, it is determined whether at least part of the displaced display frame 132 (and the display screen 133) is located within the displayable range 131 or the entire is out of the displayable range 131 (Step S41).

When it is determined that the entire display frame 132 is out of the displayable range 131, it is determined whether the time measured by the timer provided in the second CPU 71, which is continued after the entire display frame 132 is first out of the displayable range 131, is larger than the predetermined time Ts stored in the main unit memory 78 in advance (Step S42).

The predetermined time Ts, as mentioned above, can be set at a desired period of time by operating the menu button 53, the menu select switches 56, 57, 58, and 59, and the determination switch 55 which are shown in FIG. 11.

When it is determined at Step S42 that the predetermined time Ts has elapsed, the power supply circuit 75 of the main unit 3 is set in the low power consumption mode so as to reduce the electric power supplied from the power supply circuit 75 while a signal indicating the low power consumption mode is transmitted to the head-mounted unit 2 (Step S43).

Then, the first CPU 91 of the head-mounted unit 2 interprets the received signal indicating the low power consumption mode so as to set the power supply circuit 92 in the low power consumption mode.

In the low power consumption mode, specifically, operations other than part of functions of the first CPU 91 and the second CPU 71 or operations of blocks other than CPUs are stopped, and it is the same as known means.

On the other hand, when it is determined at Step S41 that at least part of the display frame 132 is located within the displayable range 131 so that images can be displayed, or when the non-displayed time of the display frame 132 is shorter than the predetermined time Ts at Step S42, information of the display frame 132 and information of the display screen 133 are mapped and stored in the main unit memory 78 so that the display screen is moved by a distance corresponding to the displacement amount calculated at Step S40 in a direction opposite to the angular change of the observer head in the yaw direction or the pitch direction (Step S44).

The data stored in each address of the main unit memory 78 one-to-one corresponds to the display position in the LCD 104 of the head-mounted unit 2 (each pixel position)

Then, the display data mapped on each address of the main unit memory 78 is transmitted to the head-mounted unit 2 (Step S45).

After the processing of Step S45, the main unit 3 returns to Step S37 so as to repeat the operation described above.

On the other hand, the head-mounted unit 2 receives the display data transmitted from the main unit 3 (Step S46) so as to be stored in the memory 113 (Step S47).

The data stored in each address of the memory 113 one-to-one corresponds to the data stored in each address of the main unit memory 78. Hence, the data stored in each address of the memory 113 one-to-one corresponds to each pixel constituting the LCD 104. In such a manner, by mapping (storing two-dimensional display data) the display data on each address of the main unit memory 78 of the main unit 3 or the memory 113 of the head-mounted unit 2, arbitrary information can be displayed on the LCD 104.

Then, the head-mounted unit 2 displays the display data stored in the memory 113 by the LCD 104 (Step S48).

After the processing of Step S48, the head-mounted unit 2 returns to Step S31 so as to repeat the operation described above.

Figure 24:
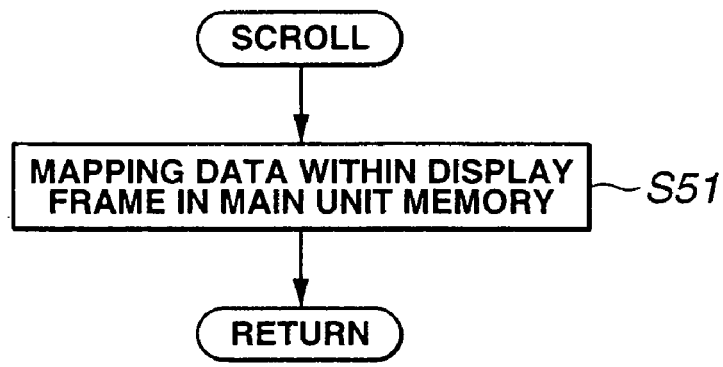
FIG. 24 is a flowchart showing a scroll process executed as an interrupt handling according to the first embodiment.

Subsequently, FIG. 24 is a flowchart showing a scroll process executed as an interrupt handling.

In the information display apparatus 1, the images displayed within the display frame 132 can be scrolled. Upon scrolling, the interrupt is generated so as to execute the scrolling processing.

That is, upon initiating the interrupt processing, the data in the main unit memory 78 is mapped so that data, such as characters and images, within the display frame 132 are shifted in a predetermined direction corresponding to the operated scrolling direction and the scroll amount (Step S51). Then, the interrupt processing is returned to the original processing.

The scrolling operation is performed by operating a predetermined key arranged in the keyboard 45 of the main unit 3 (see FIG. 10). While the key is pushed, the scrolling operation is performed in a predetermined direction. Upon scrolling, the display region is updated so that images within the display region are scrolled.

Figure 25:
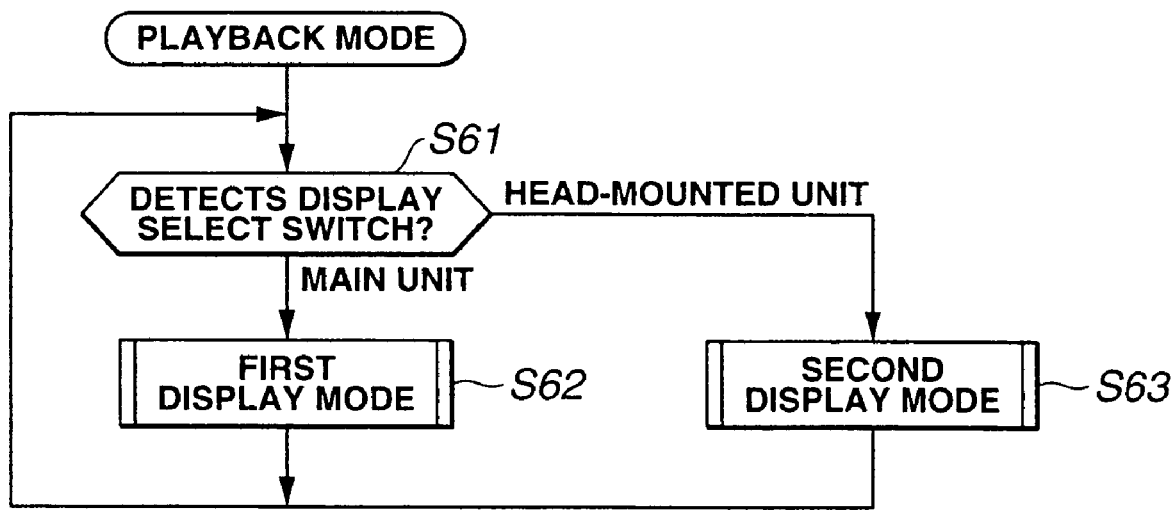
FIG. 25 is a flowchart illustrating the display control when the information display apparatus is operated as a playback device according to the first embodiment.
Figure 18:
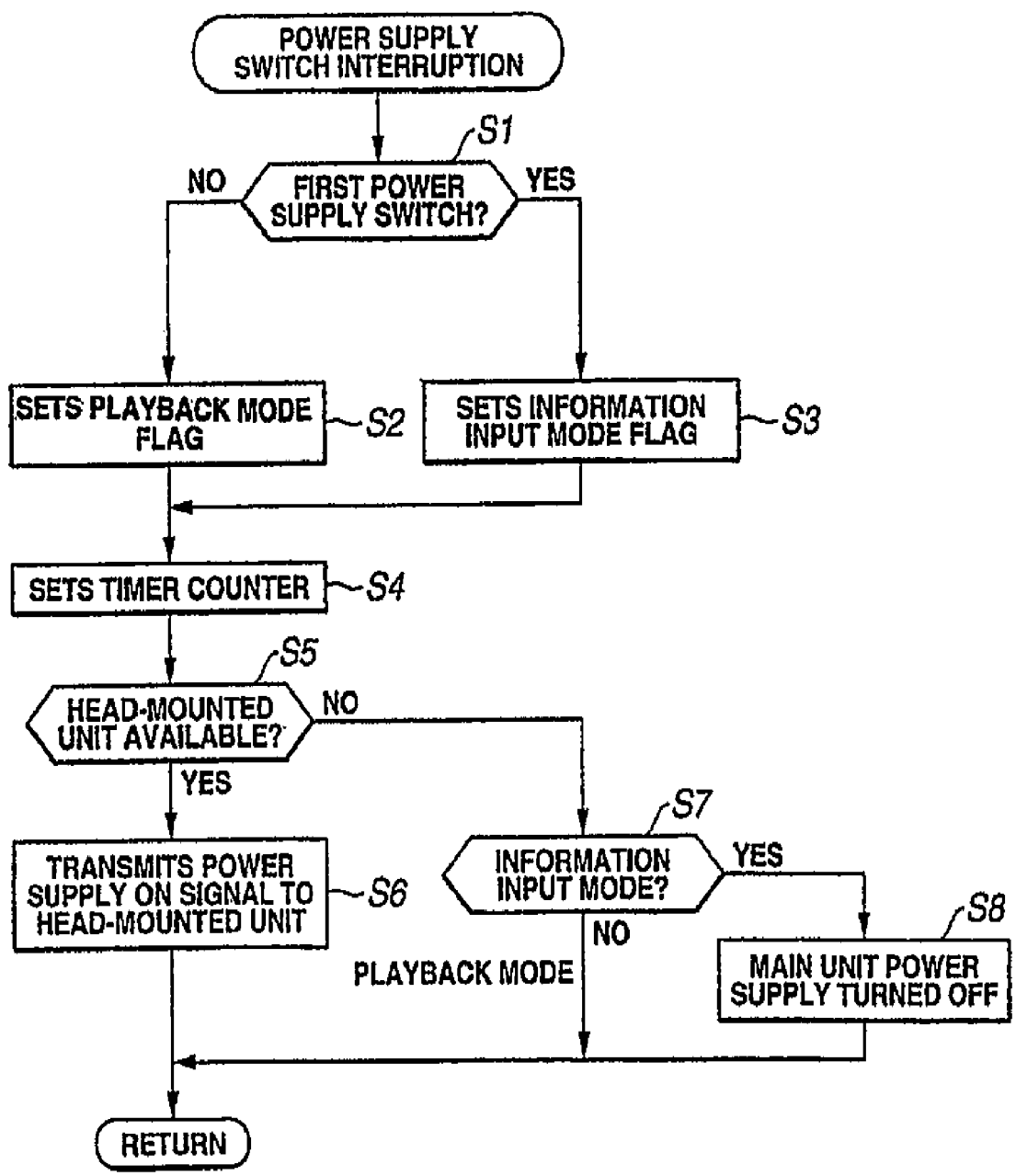

Next, FIG. 25 is a flowchart illustrating the display control when the information display apparatus 1 is operated as the playback device. The main unit 3 of the information display apparatus 1 in the playback mode is in the state shown in FIG. 11.

Upon starting the processing in the playback mode, the state of the display select switch 64 shown in FIG. 11 is detected at first (Step S61).

When "BDY" is selected by the display select switch 64 (the main unit 3 is referred to as "BDY"), i.e., the playback information by the LCD 51 of the main unit 3 is selected, the processing in the first display mode is executed (Step S62). The first display mode is the same as the display control in a general playback device, in which information stored in the record memory 83 or the hard disk 85 is read out so as to be temporarily stored in the main unit memory 78; the information stored in the main unit memory 78 is converted into analog data by the D/A converter 79 so as to be displayed on the LCD 51.

On the other hand, when "HD" is selected by the display select switch 64 (the head-mounted unit 2 is referred to as "HD"), i.e., the playback information by the LCD 104 of the head-mounted unit 2 is selected, the processing in the second display mode is executed (Step S63). In the second display mode, data read out of the record memory 83 or the hard disk 85 is temporarily stored in the main unit memory 78; the data is transmitted to the head-mounted unit 2 so as to be displayed on the LCD 104 of the head-mounted unit 2.

In the playback mode shown in FIG. 25, the difference between the second display mode (the first display mode here is used for displaying information on the LCD 51 of the main unit 3, and because the LCD 51 is not used in the information input mode shown in FIG. 10, it is omitted from the comparative object here) and the information input mode shown in FIG. 23 is as follows. First, in the information input mode, information is input by operating the first operating switch 72 so as to display the input information.

Whereas, in the second display mode, information stored in the record memory 83 or the hard disk 85 is displayed. In such a manner, the input end of information is the only difference between the second display mode and the information input mode, and the other operations, such as operation that the position of the display frame 132 is controlled corresponding to the head inclination so as to play back and display information as if an observer were watching a monitor installed in the external world, are the same.

In the above description, the record memory 83 or the hard disk 85 is used for the information source when the information display apparatus 1 is used for the playback device; it is not limited to this, so that the external information source via communicating means may also be used as the information source to input information for playing back. Specifically, information may be input from the Internet via a network interface. In this case, the information display apparatus 1 can be used as an Internet terminal.

According to the first embodiment, regardless of the head inclination of an observer, images are shifted in a direction opposite to the inclination direction of the observer head so that the position of virtual images observed from the observer substantially remains constant, so that the observer can observe images as if he or she were watching a display screen (large sized, for example) fixed to the external world.

Furthermore, since the initial position of images to be displayed is adjustable, the optimum initial position corresponding to differences among individuals and purposes of the usage for an observer can be selected. Thus, when using this display in a tram as a monitor of a personal computer, for example, by setting the display screen to downward slant, characters can be inputted from the keyboard of the main unit. Because the head inclination angle is detected using the initial position as a reference, images can be observed about the head position in natural posture, for example. Such initial position adjustment of the display screen gives an observer a sense just like setting a display screen installed on the external world at an optimum position, improving convenience.

Even when the head inclination is changed, if the angular variation within a predetermined time is less than the first threshold value, the display screen is not shifted in a direction opposite to the head angular change, so that it is not necessary to perform calculation every time the head is minutely changed, reducing the load on CPUs.

Moreover, when the head inclination is changed in the opposite direction, a threshold value for determining whether the display screen is shifted in the direction opposite to the head angular change is set (second threshold value) larger than that in the same direction, so that the screen flickering due to the head minute vibration about the predetermined position can be efficiently prevented.

Since the display information within the display region can be scrolled in the horizontal and vertical directions, desired information can be displayed at the most easily viewable position. Thereby, information can be observed in a comfortable watching state even in the compact light weight device.

Furthermore, the head-mounted unit mainly displays information and detects angular information while other complicated computation and information recording are performed in the main unit, so that the processing load on the head-mounted unit can be reduced. Thereby, the electric power consumption of the head-mounted unit can be reduced so that the power supply battery can be miniaturized, resulting in a compact head-mounted unit with airy availability.

In particular, since the head-mounted unit communicates with the main unit by radio, the head-mounted unit is not restrained by wirings, and an observer can observe specific information while behaving freely as usual.

Since when the display frame deviates from the displayable range and images are not displayed for more than a predetermined time, the information display apparatus is automatically switched to the low power consumption mode, the electric power consumption can be reduced so as to extend a battery life without intentionally shutting off the power supply. For example, as mentioned above, even if using this display in a tram as a monitor of a personal computer and the display screen is set to downward slant, when an observer gets off the tram and raises the head, the screen vanishes from the visual range, so that external world can be freely observed without hindrance, and the observer can normally behave with safety without removing the display apparatus. Also, the electric power consumption can be reduced without shutting off the power supply.

Because the main unit is provided with an LCD, even when the head-mounted unit is removed from the head, information can be observed. At this time, the information display end is to be alternatively selected between the head-mounted unit and the main unit, so that information cannot be displayed on the non-observed side, suppressing consumption of the electric power in vain.

Furthermore, it is natural that when the head-mounted unit is available, an observer intends to observe information through the head-mounted unit. In accordance with this, the system is designed so that information is displayed with priority to the head-mounted unit when it is available, resulting in improved operability due to automated operation.

Because only by turning on/of the power source of the main unit, the power source of the head-mounted unit is simultaneously turned on/off, operation is simple and convenient especially in this information display system in which both the main unit and the head-mounted unit may be simultaneously used.

When there is no reply from the head-mounted unit, the main unit is set to be in a power off state or a stand by state, so that even when the power supply is turned on by mistake, useless power consumption is prevented or suppressed. For example, when the system is carried in a bag, there is little chance that both the main unit and the head-mounted unit, which are separated from each other, are simultaneously turned on by mistake, so that useless power consumption is securely suppressed.

The suppression of the power supply described above is effective especially for portable information display systems demanding reduction in size and weight, and battery life elongation.

In such a manner, even though it can be used casually, the system has enough value as a wearable and portable information display apparatus by providing advanced capabilities.

In the above description, in the head-mounted unit, by projecting specific information to eyes of an observer, the information is displayed so that the observer can observe it as virtual images; however, a head-mounted unit applicable to the present invention is not limited to this, so that any unit may be incorporated as long as specific information can be observed by mounting it on the head of an observer.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An information display system comprising:
   a head-mounted unit mounted on the head of an observer for displaying information so that specific information can be observed; and
   a main unit for generating display data to be displayed on the head-mounted unit,
   wherein the head-mounted unit comprises a first receiver to receive a power supply instruction signal for supplying electric power to the head-mounted unit from the main unit by radio; and a first power source including a battery for supplying electric power to the head-mounted unit on receiving the power supply instruction signal, and
   wherein the main unit comprises a signal generator to generate a power supply initiation signal for starting power supply to the main unit; a second power source including a battery for supplying electric power to the main unit on receiving the power supply initiation signal; and a second transmitter to transmit the power supply instruction signal to the first receiving means by radio after power is supplied to the main unit.

2. The system according to claim 1, wherein the head-mounted unit further comprises a first transmitter to transmit a reception confirming signal by radio for confirming that the power supply instruction signal has been received when the head-mounted unit receives the power supply instruction signal by the first receiver, and
   wherein the main unit further comprises a second receiver to receive the reception confirming signal from the first transmitting means by radio, and the second power source puts the main unit into any one of a stand-by state and a power turned-off state when the second receiver does not receive the reception confirming signal.

* * * * *

UNITED STATES PATENT AND TRADEMARK OFFICE
CERTIFICATE OF CORRECTION

PATENT NO.        : 7,173,765 B2
APPLICATION NO.   : 11/180883
DATED             : February 6, 2007
INVENTOR(S)       : Masafumi Yamasaki It is certified that error appears in the above-identified patent and that said Letters Patent is hereby corrected as shown below:

Column 17, lines 48-52 change "playback" to --information input--;

Column 17, line 52 change "S2" to --S3--;

Column 17, lines 53-57 change "information input" to --playback--;

Column 17, line 57 change "S3" to --S2--.

In the Drawings:

Figure 18, sheet 11 of 16 should be replaced with the attached replacement sheet containing Figure 18.

Signed and Sealed this

Twenty-first Day of August, 2007

JON W. DUDAS
*Director of the United States Patent and Trademark Office*